(12) United States Patent
Ly et al.

(10) Patent No.: US 10,797,935 B2
(45) Date of Patent: Oct. 6, 2020

(54) METHODS AND APPARATUS FOR ENHANCING NATIVE SERVICE LAYER DEVICE MANAGEMENT FUNCTIONALITY

(71) Applicant: CONVIDA WIRELESS, LLC, Wilmington, DE (US)

(72) Inventors: Quang Ly, North Wales, PA (US); Dale N. Seed, Allentown, PA (US); Michael F. Starsinic, Newtown, PA (US); Chonggang Wang, Princeton, NJ (US); Rocco Di Girolamo, Laval (CA); Vinod Kumar Choyi, Conshohocken, PA (US); William Robert Flynn, IV, Schwenksville, PA (US); Zhuo Chen, Claymont, DE (US); Shamim Akbar Rahman, Cote St. Luc (CA); Yogendra C. Shah, Exton, PA (US); Xu Li, Plainsboro, NJ (US); Catalina Mihaela Mladin, Hatboro, PA (US); Lijun Dong, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 77 days.

(21) Appl. No.: 15/754,865

(22) PCT Filed: Sep. 2, 2016

(86) PCT No.: PCT/US2016/050113
§ 371 (c)(1),
(2) Date: Feb. 23, 2018

(87) PCT Pub. No.: WO2017/040931
PCT Pub. Date: Mar. 9, 2017

(65) Prior Publication Data
US 2019/0182098 A1    Jun. 13, 2019

Related U.S. Application Data

(60) Provisional application No. 62/213,285, filed on Sep. 2, 2015.

(51) Int. Cl.
*H04L 12/24* (2006.01)
*G06F 9/455* (2018.01)
(Continued)

(52) U.S. Cl.
CPC ...... *H04L 41/0226* (2013.01); *G06F 9/45512* (2013.01); *H04L 41/0213* (2013.01);
(Continued)

(58) Field of Classification Search
CPC . H04L 41/0213; H04L 41/0226; H04L 67/12; H04W 4/70; G06F 8/654
See application file for complete search history.

(56) References Cited

U.S. PATENT DOCUMENTS

| 10,382,924 | B2 * | 8/2019 | Wu | ............... H04W 24/02 |
| 2011/0029573 | A1 * | 2/2011 | Li | ............... G06F 16/289 |
| | | | | 707/802 |

(Continued)

FOREIGN PATENT DOCUMENTS

| WO | 2015/061290 A1 | 4/2015 |
| WO | 2016/070064 A1 | 5/2016 |

OTHER PUBLICATIONS

ITU-T. "M2M service layer: Requirements and architectural framework". FG M2m D2.1—Version 1.0. pp. 1-15. (Year: 2014).*
(Continued)

Primary Examiner — John M MacIlwinen
(74) Attorney, Agent, or Firm — BakerHostetler

(57) ABSTRACT

Enhancements to the device management functionality within service layer architecture of a Gateway node are described. The SL application registration procedure can be
(Continued)

enhanced for devices in support of device management. Functionality can be added to the service layer to initiate automated request notification for DM purposes. Lightweight SL Transport Protocol bindings can support sending multiple DM commands called DM Action Scripts with a specific focus on the Constrained Application Protocol (CoAP) Protocol.

12 Claims, 22 Drawing Sheets

(51) Int. Cl.
    *H04L 29/08*     (2006.01)
    *H04W 4/70*     (2018.01)
    *G06F 8/654*     (2018.01)

(52) U.S. Cl.
    CPC ............... *H04L 67/12* (2013.01); *H04W 4/70* (2018.02); *G06F 8/654* (2018.02)

(56) References Cited

U.S. PATENT DOCUMENTS

| | | | | |
|---|---|---|---|---|
| 2013/0219064 A1* | 8/2013 | Zhang | ...................... | H04W 4/00 709/225 |
| 2014/0126581 A1* | 5/2014 | Wang | ...................... | H04W 4/70 370/431 |
| 2015/0127831 A1* | 5/2015 | Kim | ...................... | H04W 4/80 709/225 |
| 2015/0296470 A1* | 10/2015 | Kim | ...................... | H04W 4/70 455/435.2 |
| 2017/0048336 A1* | 2/2017 | Novo Diaz | ............. | H04L 67/02 |

OTHER PUBLICATIONS

Open Mobile Alliance (OMA) "OMA Lightweight Machine to Machine Technical Specification", Approved Version 1.0, Feb. 8, 2017, 138 pages.
Open Mobile Alliance (OMA) "OMA Gateway Management Object Technical Specification", Approved Version 1.0, Jun. 18, 2013, 80 pages.
Open Mobile Alliance (OMA) "OMA Device Management Protocol OMA-TS-DM", Approved Version 1.3, May 24, 2016, 60 pages.
One M2M Technical Specification, TS-0008 OneM2M CoAP Protocol Binding, V1-0.1, Jan. 30, 2015, 14 pages.
One M2M Technical Specification, TS-0004 OneM2M Service Layer Core Protocol Specification, V1.0.1, Jan. 30, 2015, 217 pages.
One M2M Technical Specification, TS-0001 OneM2M Functional Architecture, V2.10.0, Aug. 30, 2016, 427 pages.
One M2M Technical Management, TS-0005 Management Enablement (OMA), V1.0.1, Jan. 30, 2015, 60 pages.

* cited by examiner

METHODS AND APPARATUS FOR ENHANCING NATIVE SERVICE LAYER DEVICE MANAGEMENT FUNCTIONALITY

CROSS-REFERENCE TO RELATED APPLICATIONS

This Application is a National Stage Application filed under 35 U.S.C. § 371 of International Application No. PCT/US2016/050113 filed Sep. 2, 2016, which claims the benefit of U.S. Provisional Application No. 62/213,285, filed on Sep. 2, 2015, the disclosure of which is hereby incorporated by reference as if set forth in its entirety.

BACKGROUND

Device Management (DM) is the process by which a user at a centrally located site can configure, monitor, diagnose, and otherwise manage a remotely located device. This is especially valuable when the devices are mobile in nature or deployed in remote areas that make access to them difficult. Typically, a DM server at a central site pushes commands to be executed on the device. A DM client running on the device will receive these commands and process the state changes necessary to execute the desired operations. This communication mechanism between the DM server 102 and the DM client is implemented using defined procedures and message formats and is known as a DM protocol. Two well-known Open Mobile Alliance (OMA) DM protocols are the DM Protocol (OMA Device Management Protocol, Version 1.3) and the Lightweight Machine-to-Machine (LWM2M) Protocol (OMA Lightweight Machine to Machine Technical Specification, Version 1.0).

FIG. 1 shows the OMA DM Protocol architecture 100 in which a DM Server 102 sends device management commands to DM Clients running on devices. In one embodiment, the DM server 102 is the master entity that provides commands to DM Clients to manage devices or gateways that the DM Client is running on. DM servers are also referred to as Management Servers.

In one embodiment, the DM client is an entity that runs on devices or gateways to provide communications with a DM Server. The DM client is also referred to as a Management Client.

The DM Client maintains a set of Managed Objects (MO) within a resource structure referred to as the DM Tree 104. Managed objects are resources that reside on a device in which management commands are targeted and upon which execution occurs.

These MOs are used to manage a particular function on the device such as software updates. The management commands operate on the nodes of the DM Tree 104 and may cause state changes within the device. These management commands are sent over the DM Interface using the DM Protocol as shown in FIG. 1. The Device Specific Interface 106 is outside the scope of the DM Protocol and is platform specific. This interface will be referenced as "device driver" in the rest of this application.

In one embodiment, a device driver is a device specific interface between a DM Client and the device platform in which DM actions are carried out. The device driver can be an API or system call used to initiate a DM action such as reboot or software install. This interface is out of the scope of a DM protocol.

In OMA Gateway Management Object Technical Specification, Version 1.0, OMA defined a DM Gateway that allows a DM server 102 to manage devices behind the gateway to extend the reach of DM capabilities. In one embodiment, the DM Gateway is an entity that helps manage devices connected to the gateway on behalf of a DM Server. There may be modes of operation the gateway supports to interface to different protocols the device may support.

FIG. 2 shows the DM Gateway 202 operating behind a firewall which prevents the DM Server 102 from managing devices attached to the gateway 202. Through the use of the Gateway Managed Object (GwMO), the DM server 102 is then able to manage those devices. The GwMO can operate in one of three modes: Transparent, Proxy, and Adaptation. The Adaptation mode of operation is meant to allow non-OMA DM devices such as M2M or Internet of Things (IoT) devices to be managed by the DM server 102.

The OMA LWM2M Protocol provides a client-server architecture in which a LWM2M Server 304 manages a LWM2M Client 306 running on a device.

In one embodiment, the LWM2M Server 304 is the master entity in OMA LWM2M protocol. It communicates to LWM2M Clients 306 to provide device management and information reporting capabilities.

In one embodiment, LWM2M Clients 306 run on constrained devices within M2M or IoT systems that provide device management and information reporting capabilities to LWM2M Servers 304.

FIG. 3 shows the LWM2M architecture 300 and the different interfaces it provides. In addition, LWM2M Objects 302 are resources that reside on the device and DM operations are performed on the objects.

An M2M/IoT Service Layer (SL) 402 is a technology specifically targeted towards providing value-added services for M2M/IoT devices and applications. A global standard body such as oneM2M (oneM2M TS-0001 oneM2M Functional Architecture, V-2.1.0) is developing M2M/IoT SLs to address the challenges associated with the integration of M2M'IoT devices and applications into deployments with the Internet/Web, cellular, enterprise, and home network.

An M2M/IoT SL 402 can provide applications and devices access to a collection of M2M/IoT oriented capabilities. A few examples include security, charging, data management, device management, discovery, provisioning, and connectivity management. These capabilities are made available to applications via Application Programming Interfaces (APIs) which make use of message formats, resource structures and resource representations supported by the M2M/IoT SL 402.

From a protocol stack perspective, SLs 402 are typically situated above the Application Protocol Layer 404 and provide value added services to applications they support. Hence SLs 402 are often categorized as 'middleware' services. FIG. 4 shows a service layer 402 between the Application Protocols 404 and Applications 406.

Device management is an important feature that is offered by service layer architectures such as oneM2M. It allows for managing devices deployed in the field through an application communicating to the service layer. The main focus of current device management functionality within service layers is one of interworking to existing device management architectures such as OMA DM and OMA LWM2M. The integration of these external protocols requires the use of a management adapter as shown in FIG. 5.

The management adapter 502 translates the oneM2M primitives specified within the service layer to the underlying device management protocol. As with any interworking, translation is not 100% and straightforward. As a result, the oneM2M TS-0005 Management Enablement (OMA), V-1.0.1 specifies mappings of oneM2M resources to the underlying management protocol resources. Furthermore, translation over the ms interface to a management server is also required even among servers that implement the same DM protocols. This results from the fact that there is currently no standardized interface defined between a service layer server and a management server. In addition, the management adapter 506 residing on an MN/ASN-CSE 504 implements the 1a interface in which the Device Management (DMG) functionality communicates to a management client 508. This also requires another protocol translation.

The DMG provides very little added functionality to the overall DM capabilities of the system. The DMG simply provides a translation function between the service layer protocol and the DM protocol. Thus, it is often quicker to simply integrate existing DM functionality in parallel to the service layer rather than defining a new protocol.

Within service layers, resources exist for device management purposes. These resources, called management object (<mgmtObj>) resources in oneM2M, allow applications registered to the service layer to enable controlling, managing, and initiating actions on devices.

FIG. 6 shows the reboot <mgmtObj> resource 602, which is a DM specific <mgmtObj> resource mapped to the action of rebooting the device. This resource is further mapped to corresponding DM protocol resources in oneM2M TS-0005 Management Enablement (OMA), V-1.0.1. Within the reboot <mgmtObj> resource 602, there are specific attributes used for initiating a DM action. Table 1 shows two such actions in the reboot and factoryReset attributes that are performed on the device.

TABLE 1

Reboot <mgmtObj> Resource Attributes

| Attributes of [reboot] | Multi-plicity | RW/RO/WO | Description |
|---|---|---|---|
| resourceType | 1 | RO | See clause 9.6.1.3 of the oneM2M TS-0001 oneM2M Functional Architecture, V-2.1.0 where this common attribute is described. |
| resourceID | 1 | RO | See clause 9.6.1.3 of the oneM2M TS-0001 oneM2M Functional Architecture, V-2.1.0 where this common attribute is described. |
| resourceName | 1 | WO | See clause 9.6.1.3 of the oneM2M TS-0001 oneM2M Functional Architecture, V-2.1.0 where this common attribute is described. |
| parentID | 1 | RO | See clause 9.6.1.3 of the oneM2M TS-0001 oneM2M Functional Architecture, V-2.1.0 where this common attribute is described. |
| expirationTime | 1 | RW | See clause 9.6.1.3 of the oneM2M TS-0001 oneM2M Functional Architecture, V-2.1.0 where this common attribute is described. |
| accesscontrolPolicy IDs | 0 . . . 1 (L) | RW | See clause 9.6.1.3 of the oneM2M TS-0001 oneM2M Functional Architecture, V-2.1.0 where this common attribute is described. |
| creationTime | 1 | RO | See clause 9.6.1.3 of the oneM2M TS-0001 oneM2M Functional Architecture, V-2.1.0 where this common attribute is described. |
| lastModified Time | 1 | RO | See clause 9.6.1.3 of the oneM2M TS-0001 oneM2M Functional Architecture, V-2.1.0 where this common attribute is described. |
| labels | 0 . . . 1 | RW | See clause 9.6.1.3 of the oneM2M TS-0001 oneM2M Functional Architecture, V-2.1.0 where this common attribute is described. |
| mgmtDefinition | 1 | WO | See clause 9.6.15 of the oneM2M TS-0001 oneM2M Functional Architecture, V-2.1.0. This attribute shall have the fixed value "reboot". |
| objectIDs | 0 . . . 1 (L) | RW | See clause 9.6.15 of the oneM2M TS-0001 oneM2M Functional Architecture, V-2.1.0. |
| objectPaths | 0 . . . 1 (L) | RW | See clause 9.6.15 of the oneM2M TS-0001 oneM2M Functional Architecture, V-2.1.0. |
| Description | 0 . . . 1 | RW | See clause 9.6.15 of the oneM2M TS-0001 oneM2M Functional Architecture, V-2.1.0. |
| Reboot | 1 | RW | The action that allows rebooting the device. The action is triggered by assigning value "TRUE" to this attribute. This attribute is a specialization of [objectAttribute] attribute. |
| FactoryReset | 1 | RW | The action that allows making the device return to its factory settings. The action is triggered by assigning value "TRUE" to this attribute. This attribute is a specialization of [objectAttribute] attribute. |

In addition to <mgmtObj> resources, oneM2M has defined a <node> resource where <mgmtObj> resources reside under. The <node> resource resides under <CSE-Base>. Each <node> resource corresponds to a device and the relationship between a <node> resource and an <AE> resource is shown in FIG. 7. ADN-x 702 and ADN-y 704 are devices that host <AE> applications which register to the MN-CSE 706. Each <AE> resource has a nodeLink attribute that points to the corresponding <node> resource to indicate its association to the device. Management operations can be performed on the device by initiating requests towards the <mgmtObj> resources within a <node> resource.

Although "native" DM operations are not explicitly described in the service layer standards, it can be realized using currently defined resources and procedures and some external "DM function". FIG. 8 shows the oneM2M DM architecture 800 that is interpreted from the specifications and shows how DM can be performed "natively". Note the inclusion of the DM Function component, which represents the device drivers to execute the DM operation on the underlying devices. This component is out of scope of the specifications (even for DM protocols) and are platform/device dependent.

Using existing oneM2M primitives, an Application Entity (AE) can perform management functions by manipulating the <mgmtObj> resources hosted on the Common Services Entity (CSE). The DMG running on the CSE would implement the device drivers and execute the function on the device/platform. For example, <mgmtObj> resources are created on an MN-CSE 706 and then announced to an IN-CSE 1008. Then an IN-AE 1006 can initiate a software download and install. This request would then be retargeted to the MN-CSE 706 to update the [software] resource and download and install the software. The DMG would actually perform the download of the software image and call some system API to install the software. This occurs out-of-band of the oneM2M protocol.

When it comes to performing DM on Application Dedicated Node (ADN) nodes, the procedure is more involved since the ADN's resources are hosted on the remote CSE that the ADN-AE is registered to. Hence, the resources must be created on the external CSE and also notifications need to be sent from the CSE to the ADN whenever management operation is requested. FIG. 9 shows the procedures an ADN-AE 902 would perform to enable DM functionality.

In steps 1-3 of FIG. 9, Normal Application Entity (AE) registration is performed.

In steps 4-6 of FIG. 9, ADN-AE 902 creates <node> resource on MN-CSE 706 to store its <mgmtObj> resources.

In steps 7-12 of FIG. 9, for each DM function the ADN-AE 902 supports, it creates the corresponding <mgmtObj> resource. In addition, it creates a <subscription> resource to get notifications on when a DM request is made. This is necessary since the resources are hosted on a remote CSE and not on the ADN node.

An existing scheme describes how the oneM2M <group> resource could be used to execute a sequence of DM commands and target their execution on a group of devices. The scheme describes the procedure for configuring the <group> resource to initiate such actions and gives some example embodiments on how it could be implemented on the underlying DM protocols. When it comes to performing the fanout operation, the underlying DM protocol will create individual sessions with each of the devices to download the commands. The way to trigger this group-on-group operation was to target the fanOutPoint resource as follows:

<URI of group resource for commands>-fanOutPoint/<URI of group resource for devices>

In oneM2M, the fanOutPoint is a virtual resource without any representation. When targeted, it indicates to the CSE that the requestor would like to fan out the commands specified towards the members of the indicated group. The CSE will then execute each of the commands individually on each group member and aggregate the results after all the responses are received and returns them to the original requestor. It may also send separate response for each group member.

FIG. 10A-B shows an example call flow of the group-on-group operation.

In steps 1-5 of FIG. 10A-B, the procedure used to create a <group> resource for Application Service Node (ASN) devices ASN1 1002 and ASN2 1004.

In steps 6-10 of FIG. 10A-B, the procedure used to create a <group> resource for the sequence of commands.

In step 11 of FIG. 10A-B, IN-AE 1006 initiates group-on-group operation in which the sequence of commands is to be fanned out to each of the devices.

In steps 12-19 of FIG. 10A-B, the fan out operation is carried out first by the service layer and then through the DM server 102. The IN-CSE 1008 sends fanout request through a web services API to the DM Server 102. The DM Server 102 established individual DM session with each device and pushes sequence of commands to be executed on the device. Each device returns the status of its execution. DM server 102 returns response to IN-CSE 1008 for each device. IN-CSE 1008 return responses to the IN-AE 1006 for each device.

SUMMARY

Current Device Management (DM) integration within service layer architectures comes in two flavors: 1) An over-the-top style of integration where the Service Layer (SL) is deployed in parallel with existing DM technologies, or 2) relying on the "native" service layer protocol to also perform device management. For the former case, two sets of protocols, data models, access control logic, identifications, and message formats are required in addition to protocol translation functions. This approach makes the design more complex and requires more device resources such as memory and processing capabilities. The latter case is not specified in the standards. Instead, DM functionality can be inferred in the service layer standards based on the definitions of resources, primitives, and procedures. Limited native DM functionalities at the gateway service layer node puts more requirements on devices that do not run a service layer to set up and configure the management resources themselves.

Enhancements are added to the device management functionality within service layer architecture of a Gateway node. Note that the focus of this disclosure is on M2M Gateway functionality but it could apply equally well for an M2M Server. Typically, an M2M service layer is hosting the management resources on behalf of an M2M node that does not have the capability to host those resources. As an example, an oneM2M ADN node requires an external CSE to host its resource. The external CSE could be either a Middle Node (MN) (M2M Gateway) or Infrastructure Node (IN) CSE (M2M Server). In either case, the ideas in this disclosure could apply to both the M2M Gateway and the M2M Server as well. The main features are:

Enhancing the SL application registration procedure for devices in support of device management. This feature incorporates additions to a service layer's functionality to assist devices in creating management resources on the service layer. It also provides an addressing mechanism for use on the device by specifying an attribute for the management resources that can be used to target the management function on the device.

Providing added functionality to a service layer to initiate automated request notification for DM purposes. Once the management resources are created, this feature automates the process of providing notification services to devices without the need for the device to explicitly create the subscription resources.

Defining lightweight SL Transport Protocol bindings to support sending multiple DM commands called DM Action Scripts with a specific focus on the Constrained Application Protocol (CoAP) Protocol. By defining a new CoAP header option to support DM, the notification messages can be simplified for constrained devices. DM commands can be sent within CoAP header options rather than sending the entire resource representation. In addition, the support of transmitting multiple commands are enabled by using multiple header options. Finally, CoAP multicast capabilities can be utilized to reduce the amount of message exchanges between the M2M Gateway and the devices when targeting multiple devices. In cases where inserting multiple DM commands within header options is not feasible, the commands can also be added to the payload with an exemplary format. The exemplary format simplifies parsing by the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

The following two use cases show the inefficiencies of existing DM functionality within service layer gateways that manage devices attached to it. The first use case describes the procedure using existing DM technologies as the underlying DM protocol and the second use case describes how the same scenario is applied using "native" service layer procedures.

Figure 11:
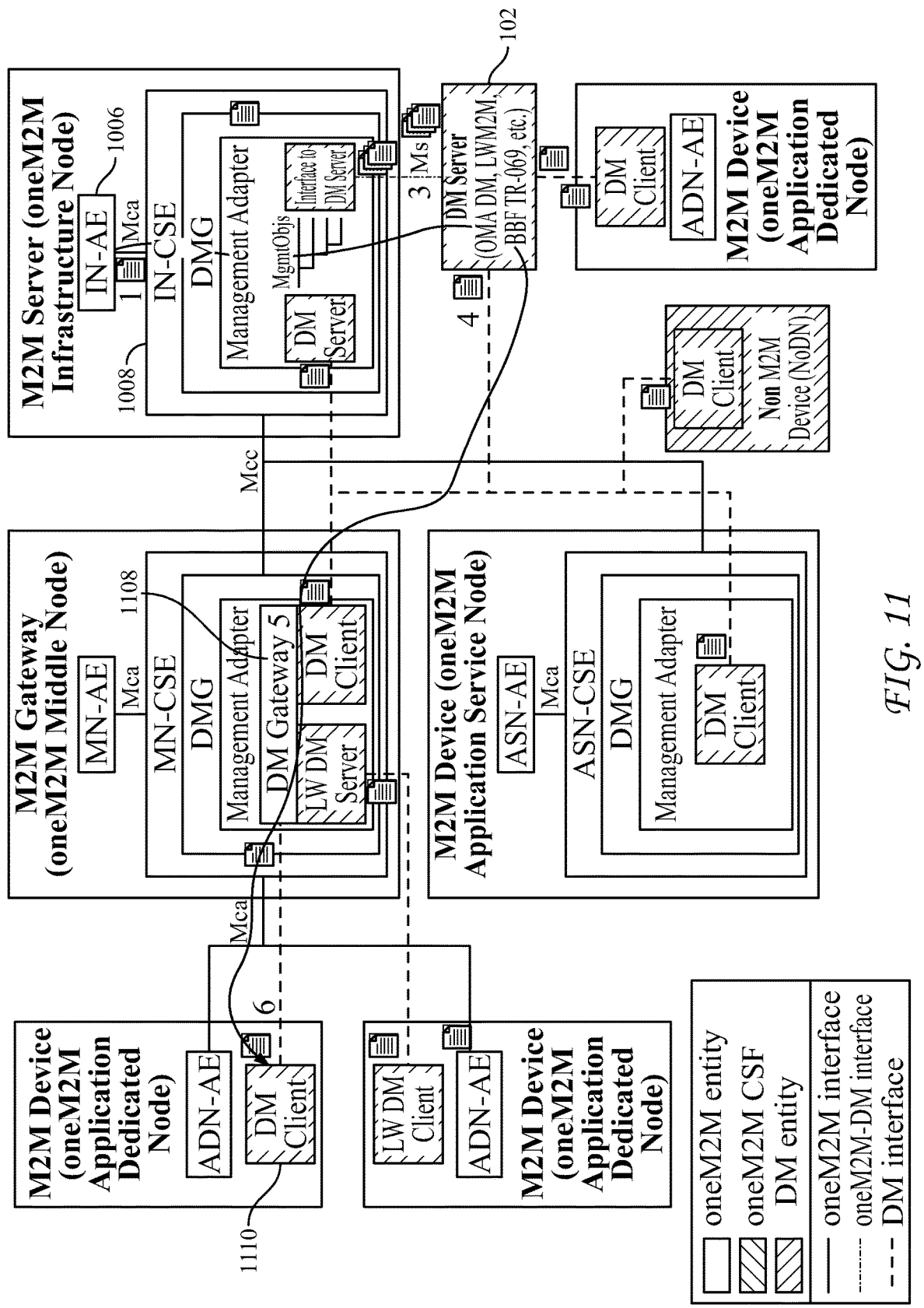
FIG. 11 is an exemplary DM message flow through a service layer and the underlying DM architecture.

In the first use case, OMA DM protocol is used to manage devices behind a gateway. In this use case, an application initiates a management command to the M2M server it is registered to by creating or by updating a SL management resource. The management resource is affiliated with a device registered to an M2M Gateway. The command is first translated by the M2M server to an appropriate web services API that the external DM server 102 understands. The DM server 102 then converts the command to a DM protocol message and sends it to the DM Gateway 1108. Within the gateway, it may need to repackage the message depending on its mode of operation—in this case, it is assumed the DM Gateway 1108 merely retargets the message to the device. The DM Client 1110 within the device processes and executes the command. The response follows the reverse path of the original request. FIG. 11 shows the navigation path the message goes through to achieve this functionality using the oneM2M service layer as an example. The detailed steps are described below.

In step 1 of FIG. 11, the IN-AE 1006 initiates a DM operation by creating or updating a <mgmtObj> in the IN-CSE 1008.

In step 2 of FIG. 11, the IN-CSE 1008 creates or updates the associated <mgmtObj> resource within its resource tree and the Management Adapter translates the operation to some proprietary interface to the DM Server 102. The translation here involves both command and resource model translation associated with the DM operation and the proprietary interface is typically web services based.

In step 3 of FIG. 11, the translated message is sent to the DM Server 102 over the Ms interface. Currently, this is a proprietary interface and will be different for different DM servers even if they implement the same protocol. Each DM server vendor will define its own web services API and hence the DM servers are not compatible with each other.

In step 4 of FIG. 11, the DM Server 102 performs some internal processing, creates a new message in the format of the underlying DM protocol and sends it the DM Gateway 1108.

In step 5 of FIG. 11, the DM Gateway 1108 performs some internal processing and may need to generate a new message depending on which mode of operation that is being requested. In this case, transparent mode is enabled since the client supports the OMA DM Protocol and the DM Gateway 1108 forwards the message to the ADN (i.e. device).

In step 6 of FIG. 11, the message arrives at the DM Client 1110 running on the device and the requested action is performed by the device drivers. When the operation is completed, a response is sent back to the DM Gateway 1108 and it follows the reverse path of the request.

Figure 1:
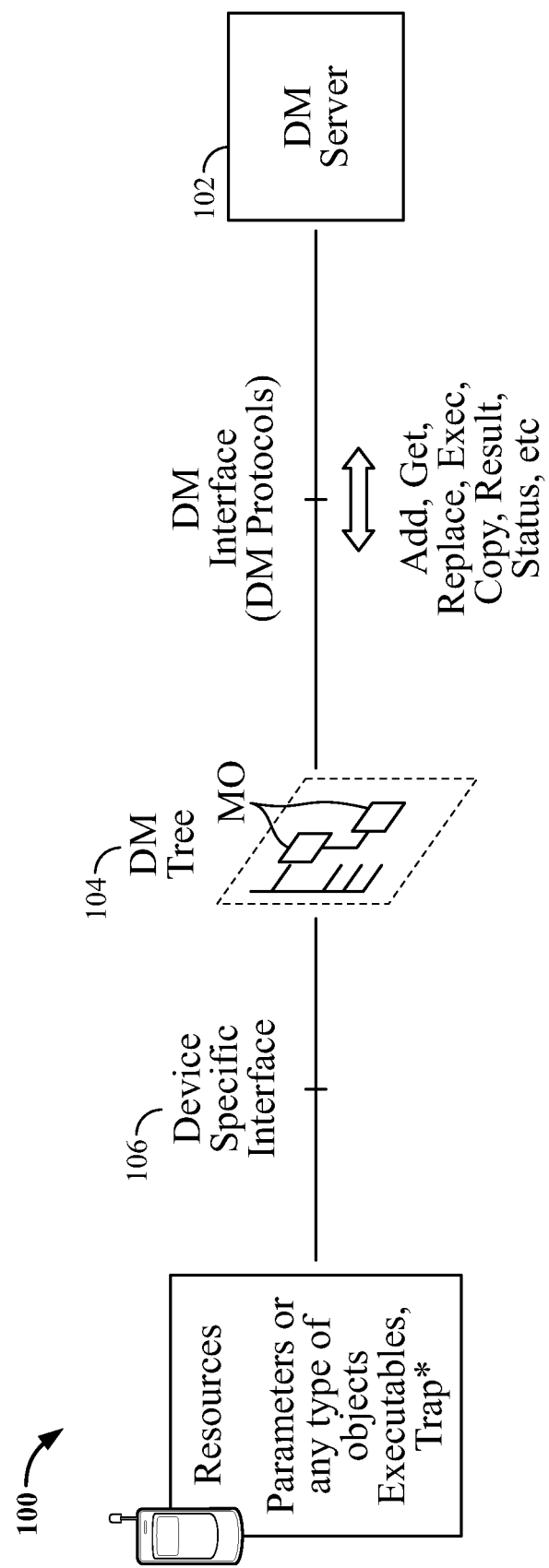
FIG. 1 is a diagram of an OMA DM protocol architecture.
Figure 2:
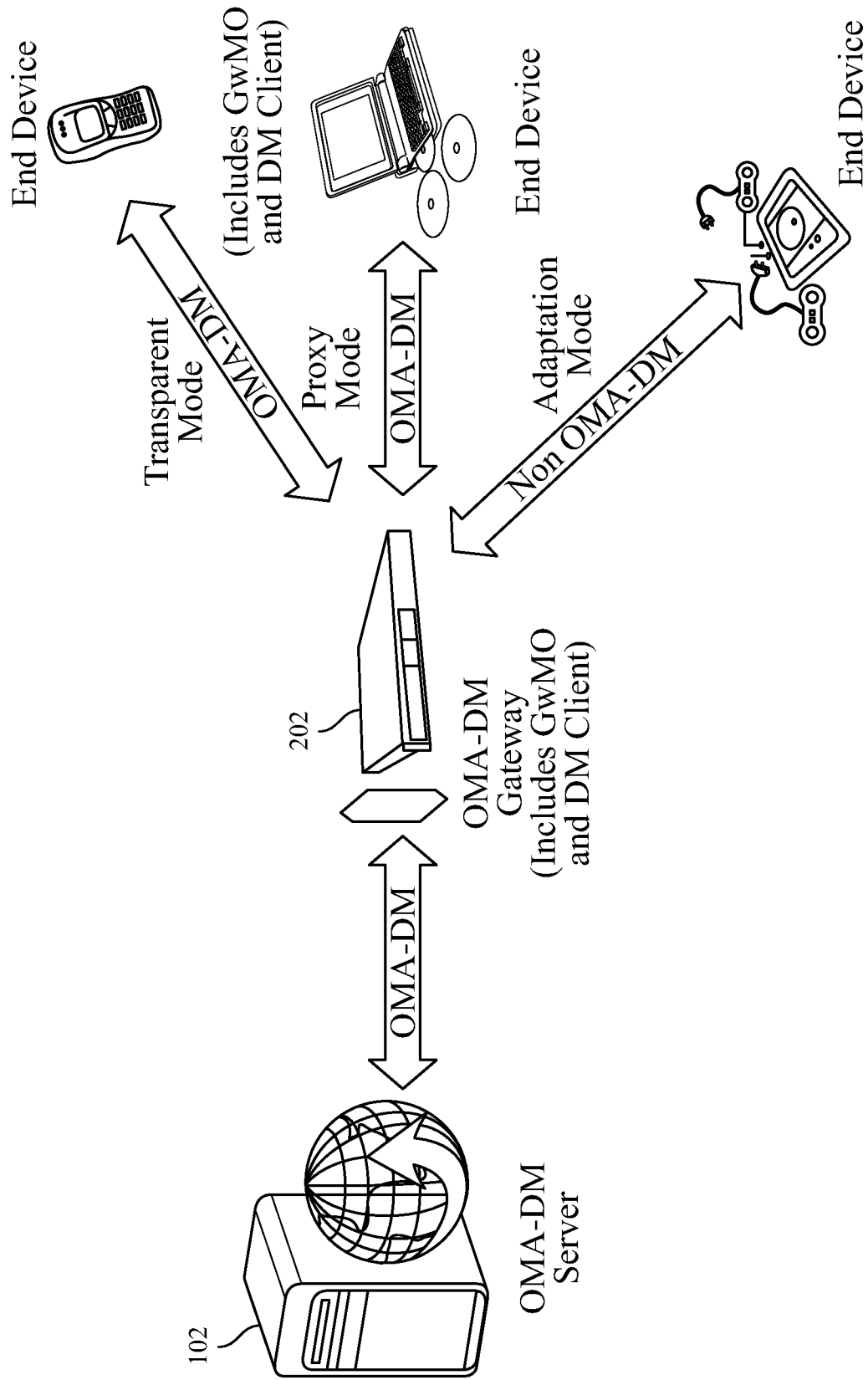
FIG. 2 is a diagram of an OMA DM gateway architecture.
Figure 3:
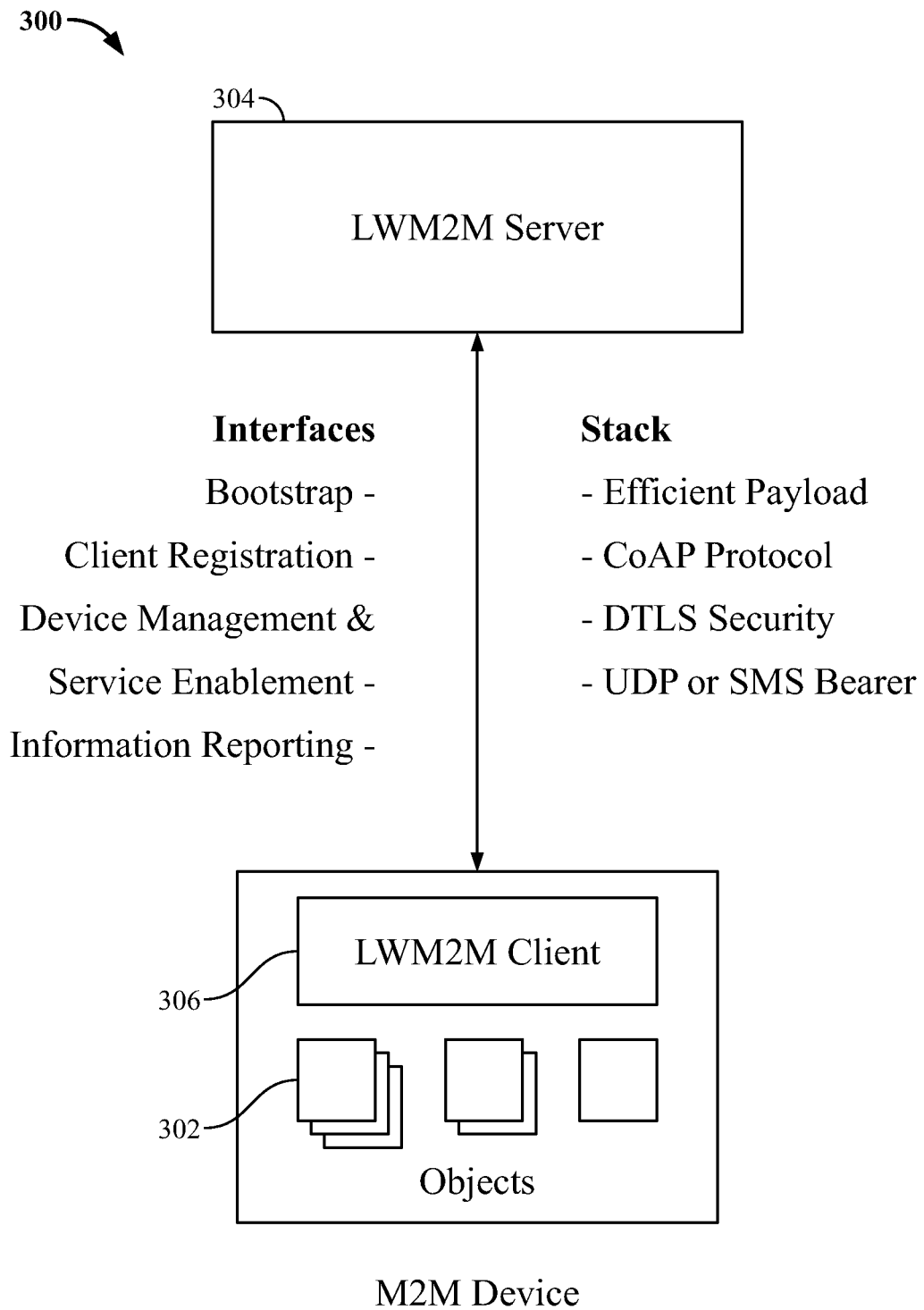
FIG. 3 is a diagram of an OMA LWM2M protocol architecture.
Figure 4:
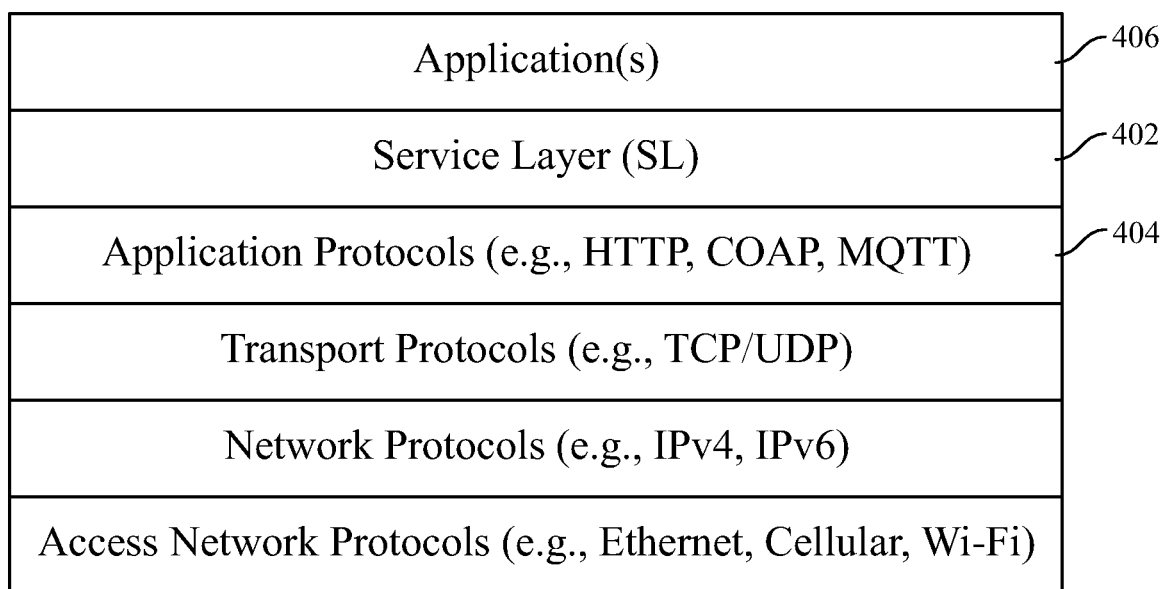
FIG. 4 is a diagram of a protocol stack supporting a service layer.
Figure 5:
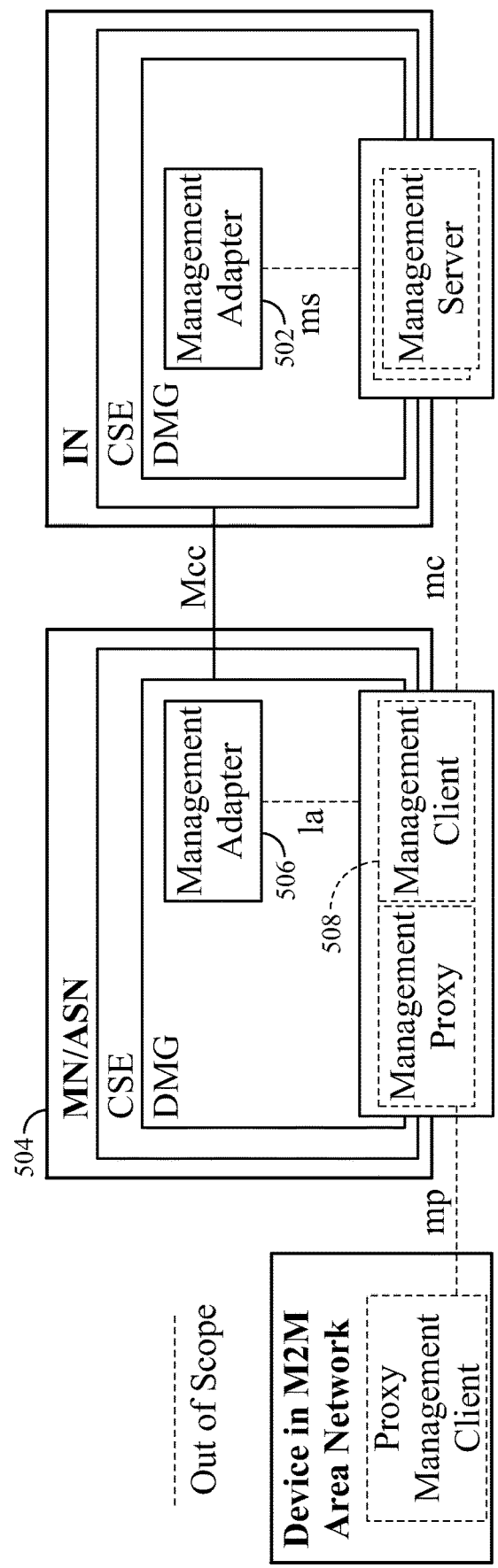
FIG. 5 is a diagram of a device management architecture within service layers.
Figure 6:
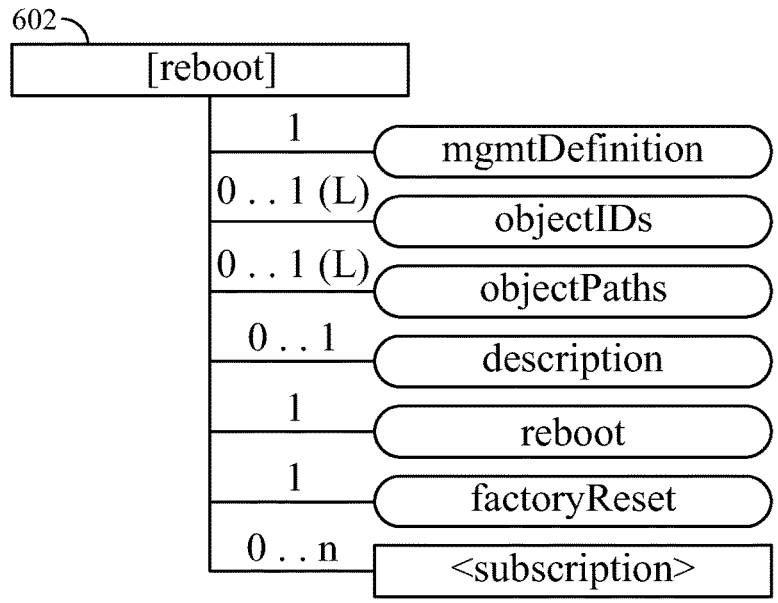
FIG. 6 is a diagram of a reboot <mgmtobj> resource.
Figure 7:
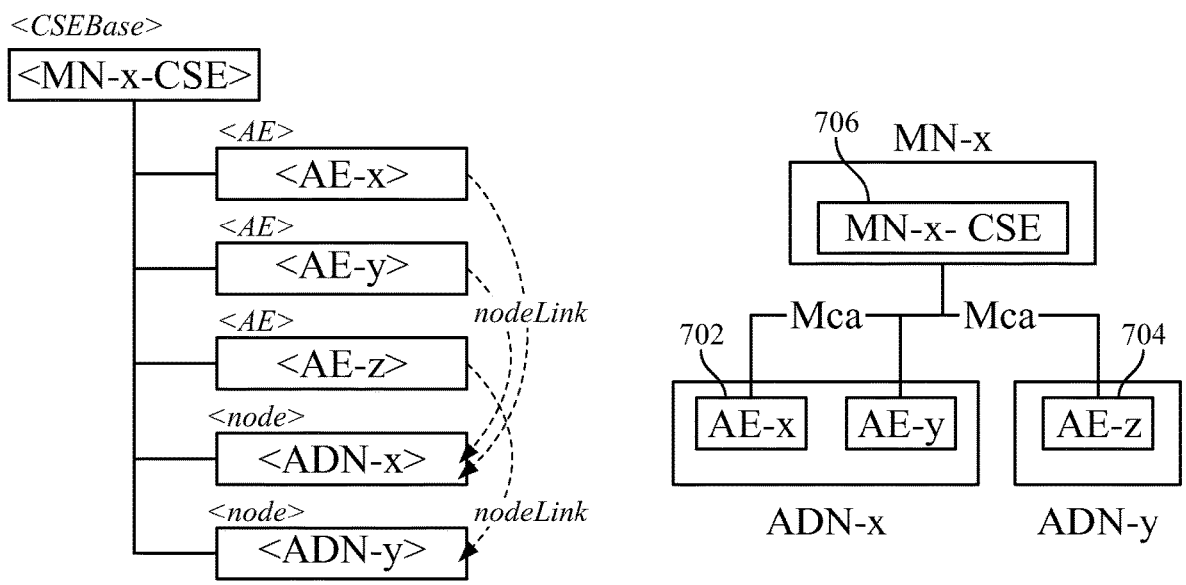
FIG. 7 is a diagram of an oneM2M <node> resource relationship to <AE> resource.
Figure 8:
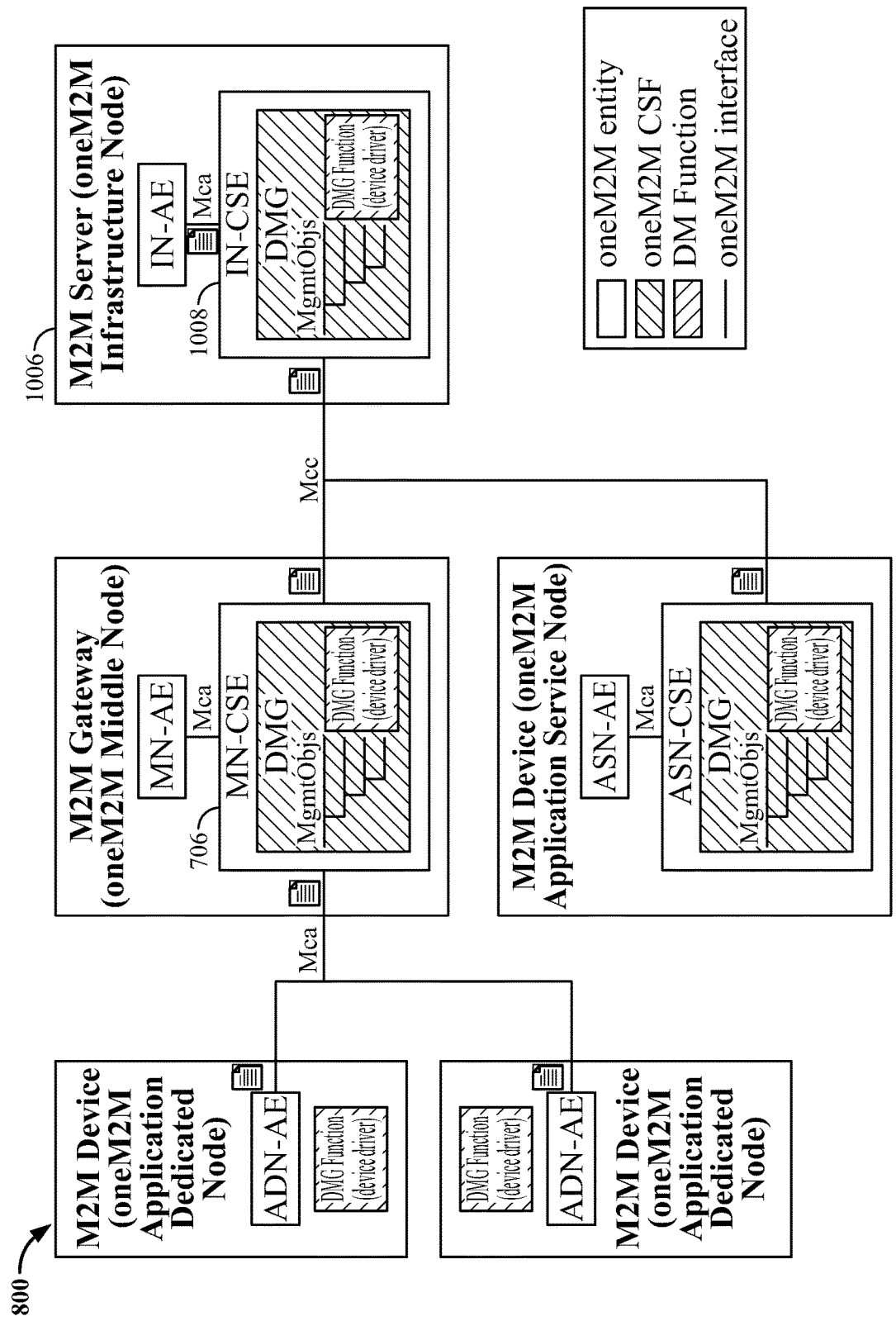
FIG. 8 is a diagram of "native" service layer DM functionality.
Figure 9:
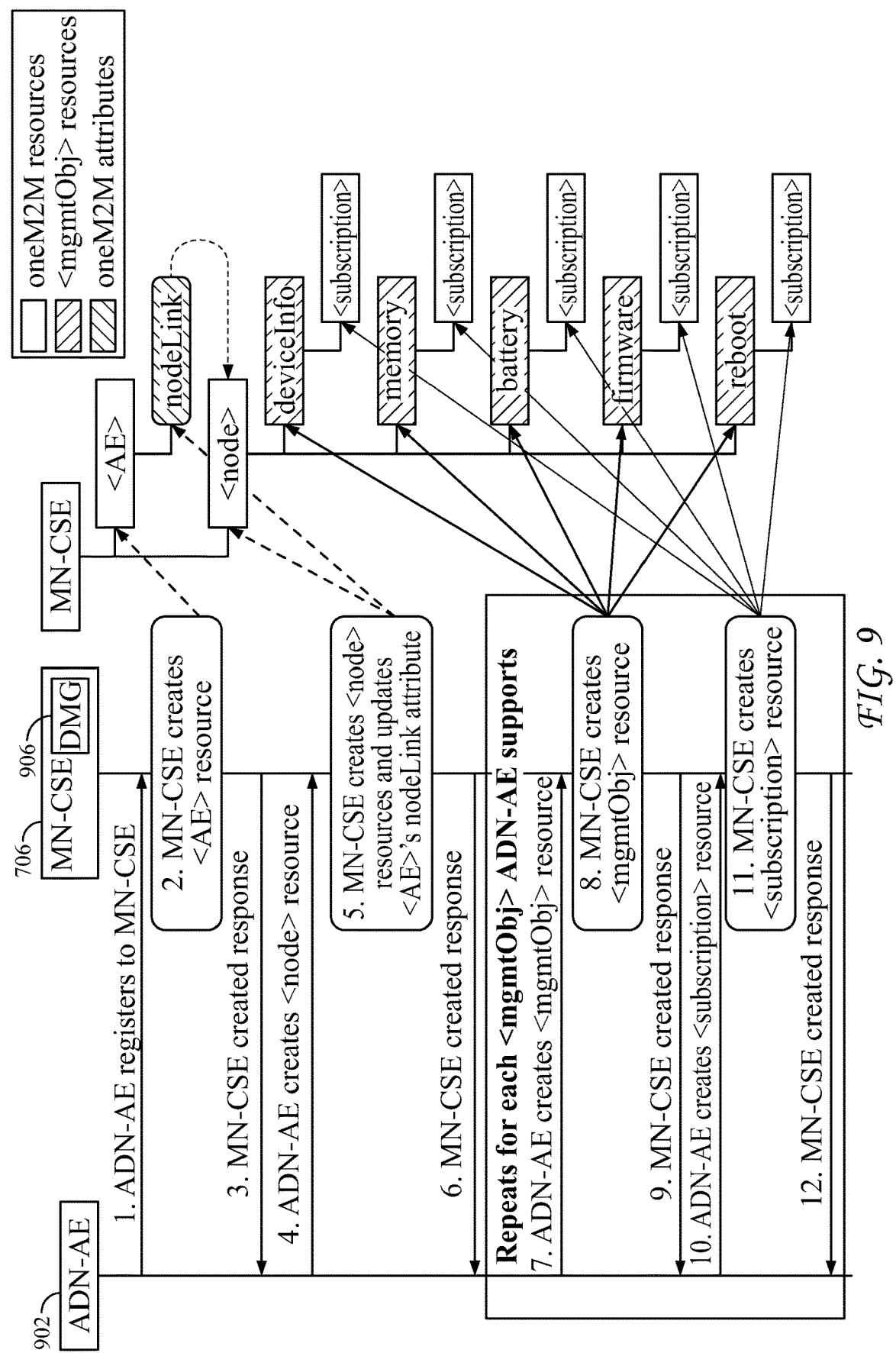
FIG. 9 shows a oneM2M native DM call flow for ADN-AE.
Figure 10A:
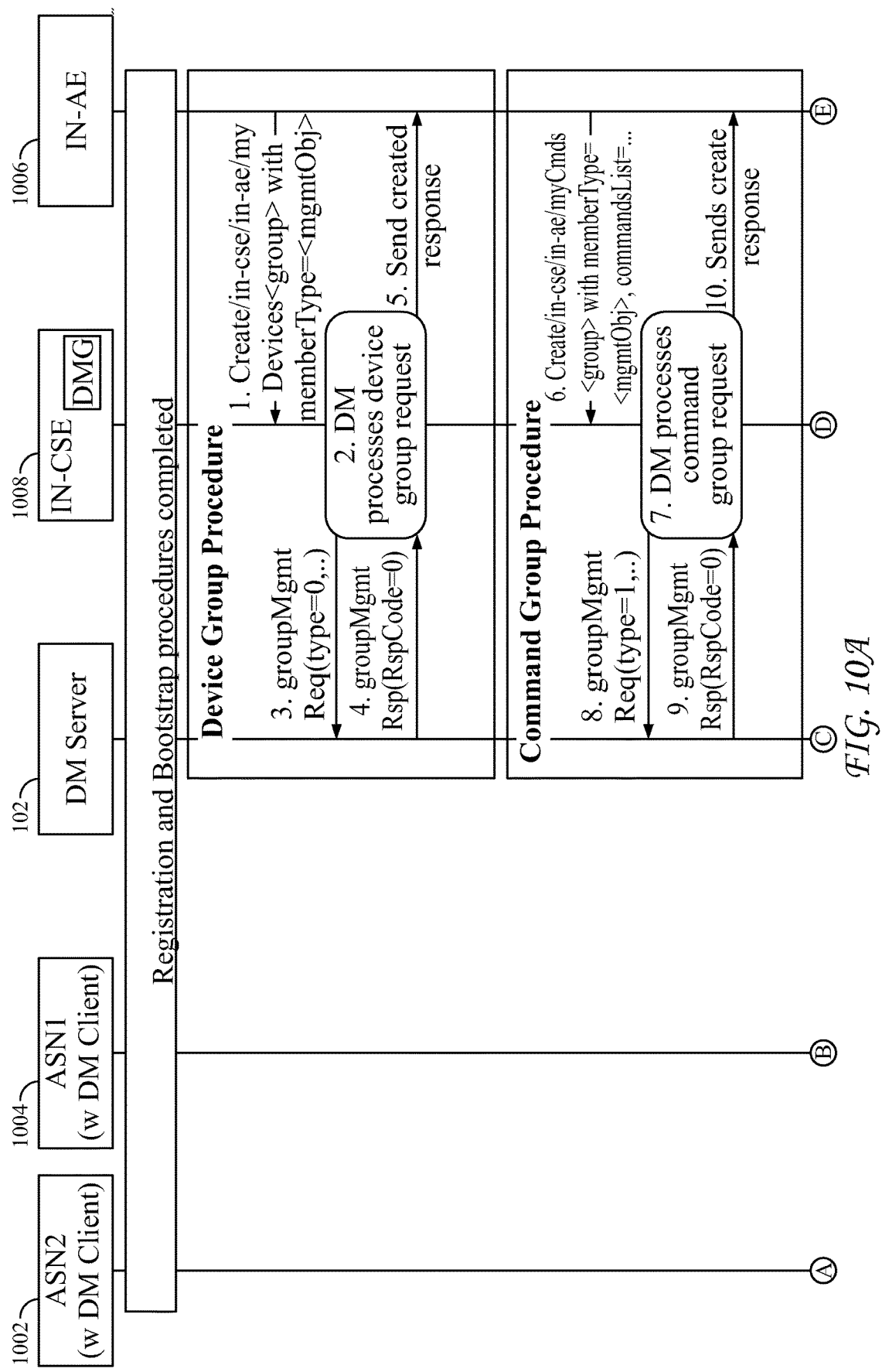
FIG. 10A-B is a group-on-group call flow example.
Figure 10B:
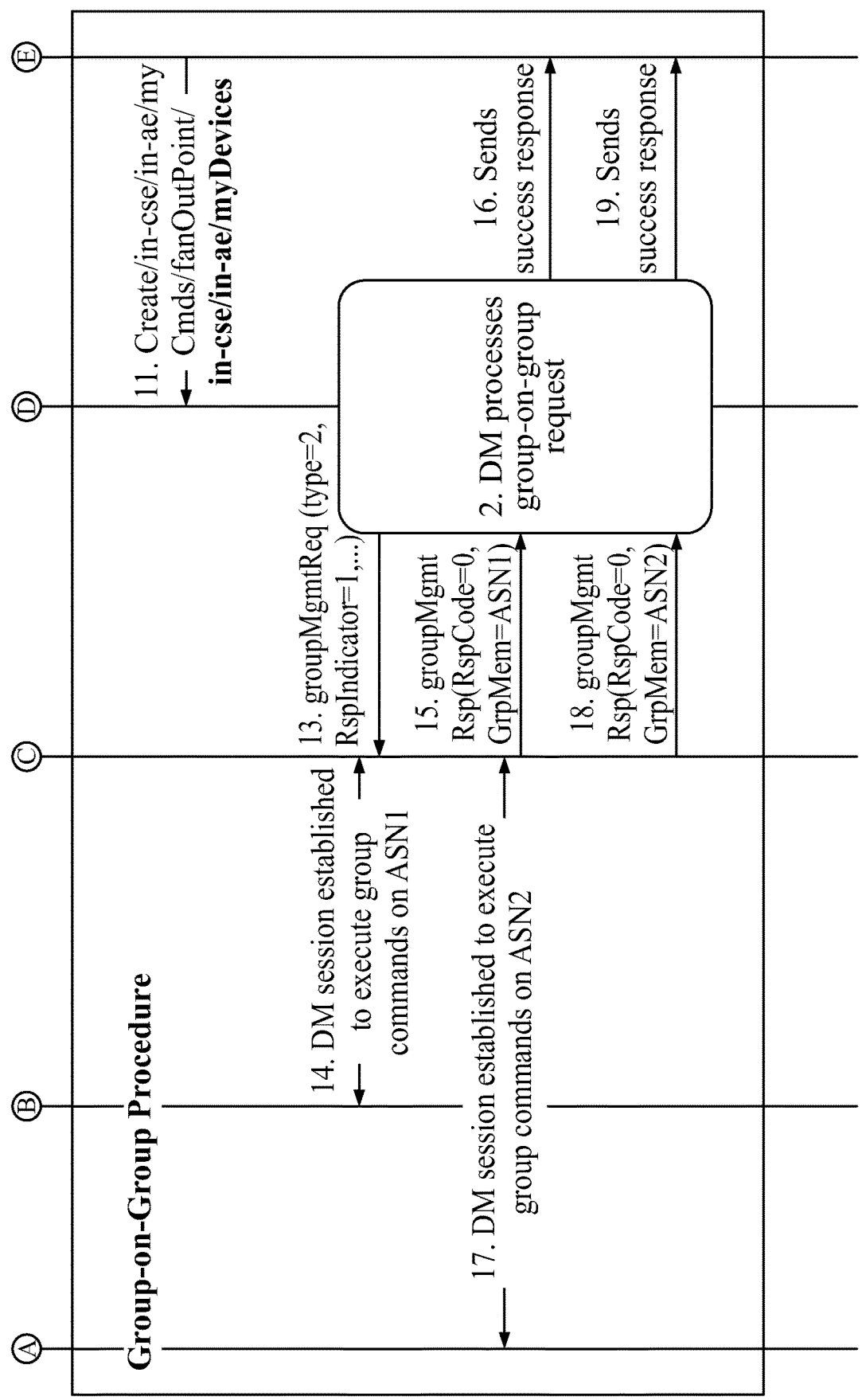
Figure 12:
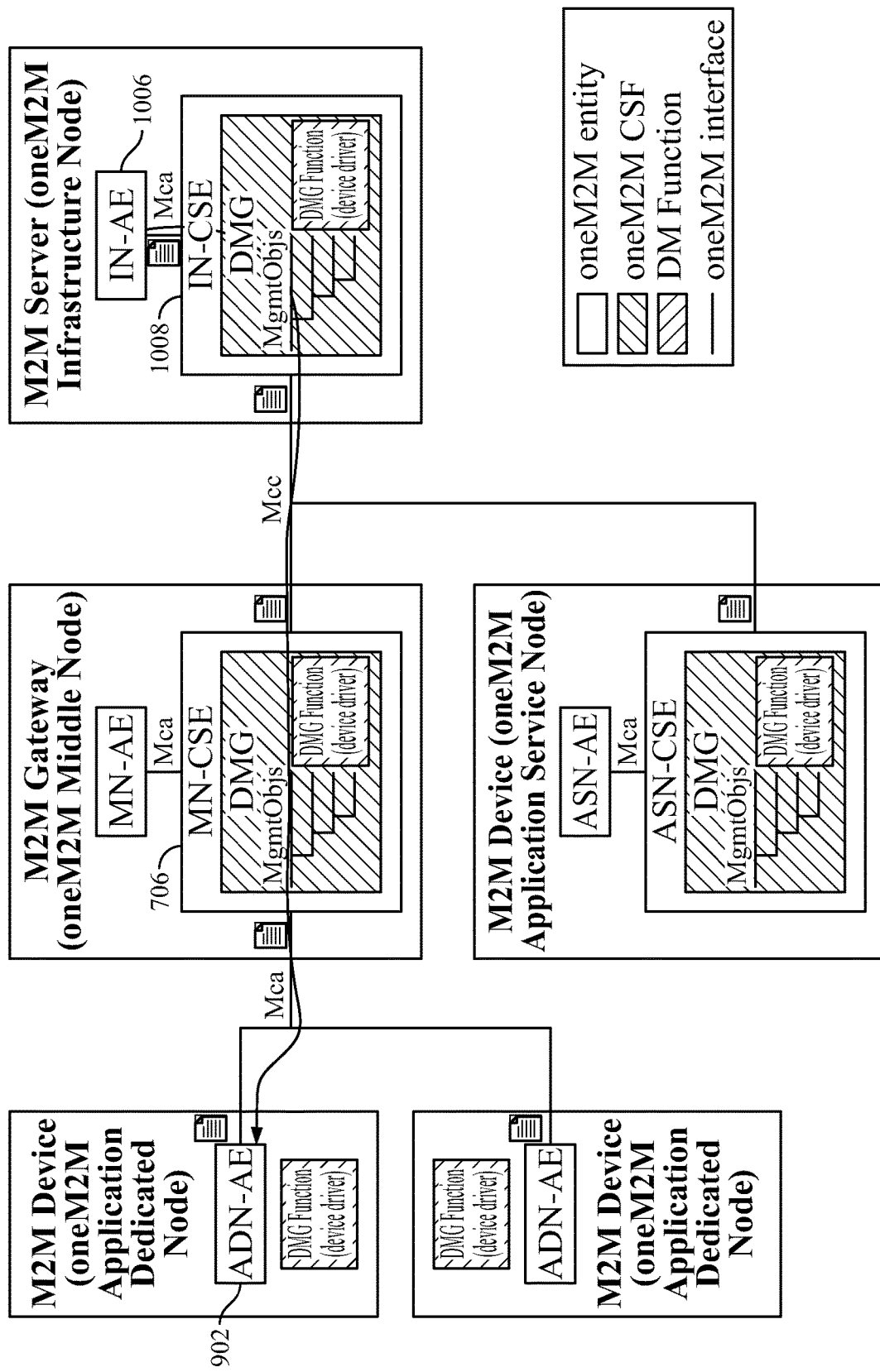
FIG. 12 is an exemplary DM message flow through native service layer architecture

FIG. 12 shows another example of the same use case but using "native" service layer protocol. In this case, note that the ADN-AE 902 stores its resources on the MN-CSE 706 and may even announce them to the IN-CSE 1008. The IN-AE 1006 still initiates the DM operation and this time, the message flows down to the MN-CSE 706 without any protocol translation. At this point, the only mechanism that exists in the specification for the ADN-AE 902 to be sent the DM request is through subscription-notification procedures. This would require that the ADN-AE 902 create the <mgmtObj> resources and then to subscribe to each mgmtObj to get notifications of DM command requests. This procedure is shown in FIG. 9. The benefit of this use case is the lack of protocol translations that occurred in the first use case and simpler implementation logic for the ADN nodes. However, it does require numerous message exchanges between the ADN-AE 902 and the MN-CSE 706 in order to enable DM operations on the ADN node.

As can be seen in the two use cases, the current implementation of device management within service layers involving a gateway is inefficient. In the first use case, there are two protocol translations performed, two sets of data models need to be maintained, and the requirements that two protocols need to be supported by the device. For constrained devices, these requirements put extra burden on the limited resources of the device. In addition, the protocol translations and data model mappings introduce complexities to the design of the system. In the second use case, current procedures would require a significant number of message exchanges to set up device management after an AE registration. This results in high signaling load and potentially increased latency.

This disclosure includes enhancements to support native DM functionalities within the service layer architecture.

Enhancing Service Layer application registration procedure

Service Layer initiated automated Request Notification Procedure

Lightweight Transport Protocol Bindings to Support Device Management

The SL application registration procedure can be enhanced to support the creation of management resources by the DM gateway. To achieve this, a new request parameter is defined to allow an application to specify which resources it supports. Alternatively, the new parameter can be included as an application resource attribute. Table 2 shows an example of a table of oneM2M Request Parameters with the attribute Supported Management Objects. This new parameter can be defined as an optional parameter during CREATE operations that can be provided in the application registration request to indicate to the M2M gateway which management resource the device supports. Alternatively, the parameter can be updated separately after the CREATE operation. The registration procedure would remain the same except for the addition of the new parameter and the newly required functionality within the gateway. The new parameter can trigger the gateway to create the corresponding management resources on behalf of the application. This streamlines the creation of the management related resources for the device and minimizes the number of message exchanges between the device and the M2M gateway. Note that when the new parameter is use in conjunction with the SL announceTo functionality, the resources the SL created on behalf of the device should also be announced along with the application resource. The SL in this case is "auto announcing" the management resources to the remote SL.

TABLE 2

New oneM2M Request Parameters

| Primitive Parameter | CREATE | RETRIEVE | UPDATE | DELETE | NOTIFY |
|---|---|---|---|---|---|
| Operation | M | M | M | M | M |
| To | M | M | M | M | M |
| From | M | M | M | M | M |
| Request Identifier | M | M | M | M | M |

TABLE 2-continued

New oneM2M Request Parameters

| Primitive Parameter | CREATE | RETRIEVE | UPDATE | DELETE | NOTIFY |
|---|---|---|---|---|---|
| Resource Type | M | NP | NP | NP | NP |
| Name | O | NP | NP | NP | NP |
| Content | M | O | M | NP | M |
| Originating Timestamp | O | O | O | O | O |
| Request Expiration Timestamp | O | O | O | O | O |
| Result Expiration Time | O | O | O | O | O |
| Operation Execution Time | O | O | O | O | O |
| Response Type | O | O | O | O | O |
| Result Persistence | O | O | O | O | NP |
| Result Content | O | O | O | O | NP |
| Event Category | O | O | O | O | O |
| Delivery Aggregation | O | O | O | O | O |
| Group Request Identifier | O | O | O | O | O |
| Filter Criteria | NP | O | O | O | NP |
| Discovery Result Type | NP | O | NP | NP | NP |
| Supported Management Objects | O | O | O | O | O |

Figure 13:
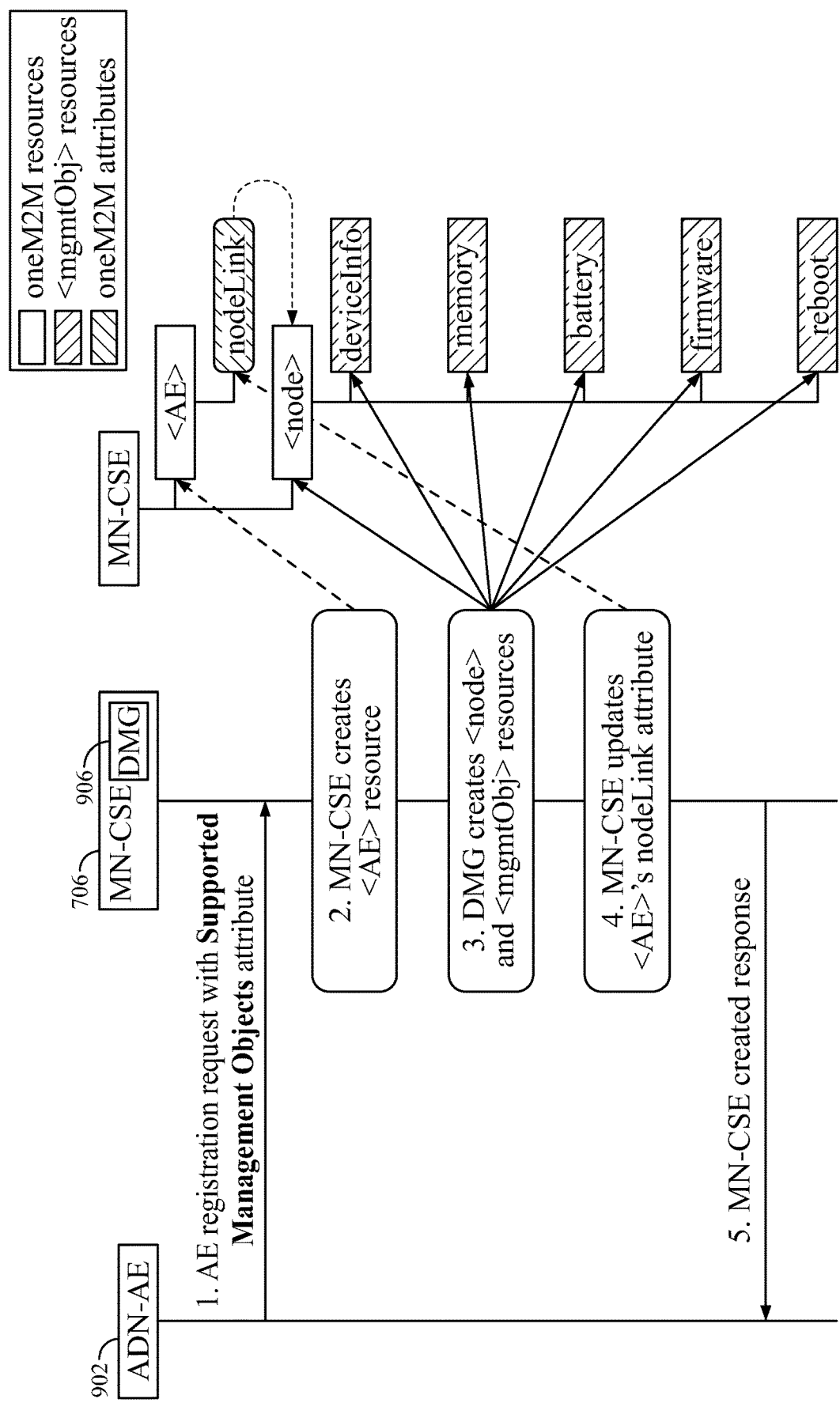
FIG. 13 is an enhanced M2M application registration call flow.

FIG. 13 shows the call flow for the enhanced M2M application registration procedure. Note that the call flow uses an oneM2M system as an example with changes to existing AE registration procedure highlighted in red text in the figure. The steps are as follows.

In step 1 of FIG. 13, an ADN-AE 902 sends an AE registration request to MN-CSE 706. Within the request, ADN-AE 902 includes the primitive attribute Supported Management Objects and provides a list of <mgmtObj> resources it supports.

In step 2 of FIG. 13, the MN-CSE 706 receives the request and processes it in the normal primitive flow. It then creates an <AE> resource for the ADN-AE registration.

In step 3 of FIG. 13, then the DMG 906 creates the <node> resource and the associated <mgmtObj> resources that were specified in the Supported Management Objects attribute of step 1 of FIG. 13. Note the specific [objectAttribute] of each <mgmtObj> will be null upon creation. These attributes will be retrieved upon a future operation on the <mgmtObj> resource.

In step 4 of FIG. 13, upon the successful creation of the <node> and <mgmtObj> resources, the DMG 906 will then update the nodeLink attribute of the <AE> resource.

In step 5 of FIG. 13, if all the previous steps completed successfully, the MN-CSE 706 sends a Created response to the ADN-AE 902. In addition to the typical information for an application create response, it may also include information about the <node> and <mgmtObj> resources that were created such as nodeID, nodeLink, mgmtObj IDs, and other attributes the device may need. If the announceTo attribute was set, then information about the results of the announced resource may also be included in the response.

Figure 19A:
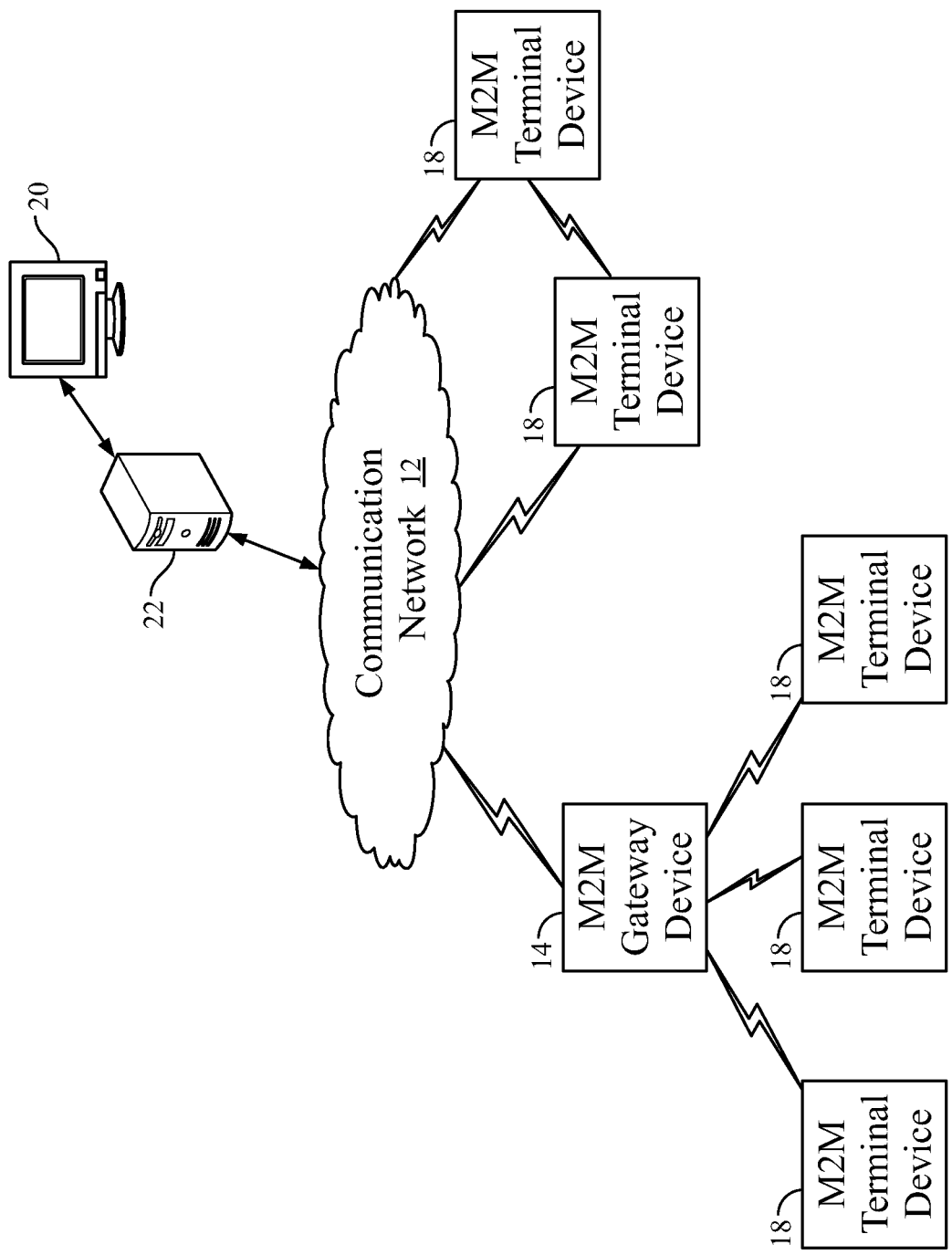
FIG. 19A is a diagram of a M2M/IoT/WoT communication system that includes a communication network.
Figure 19B:
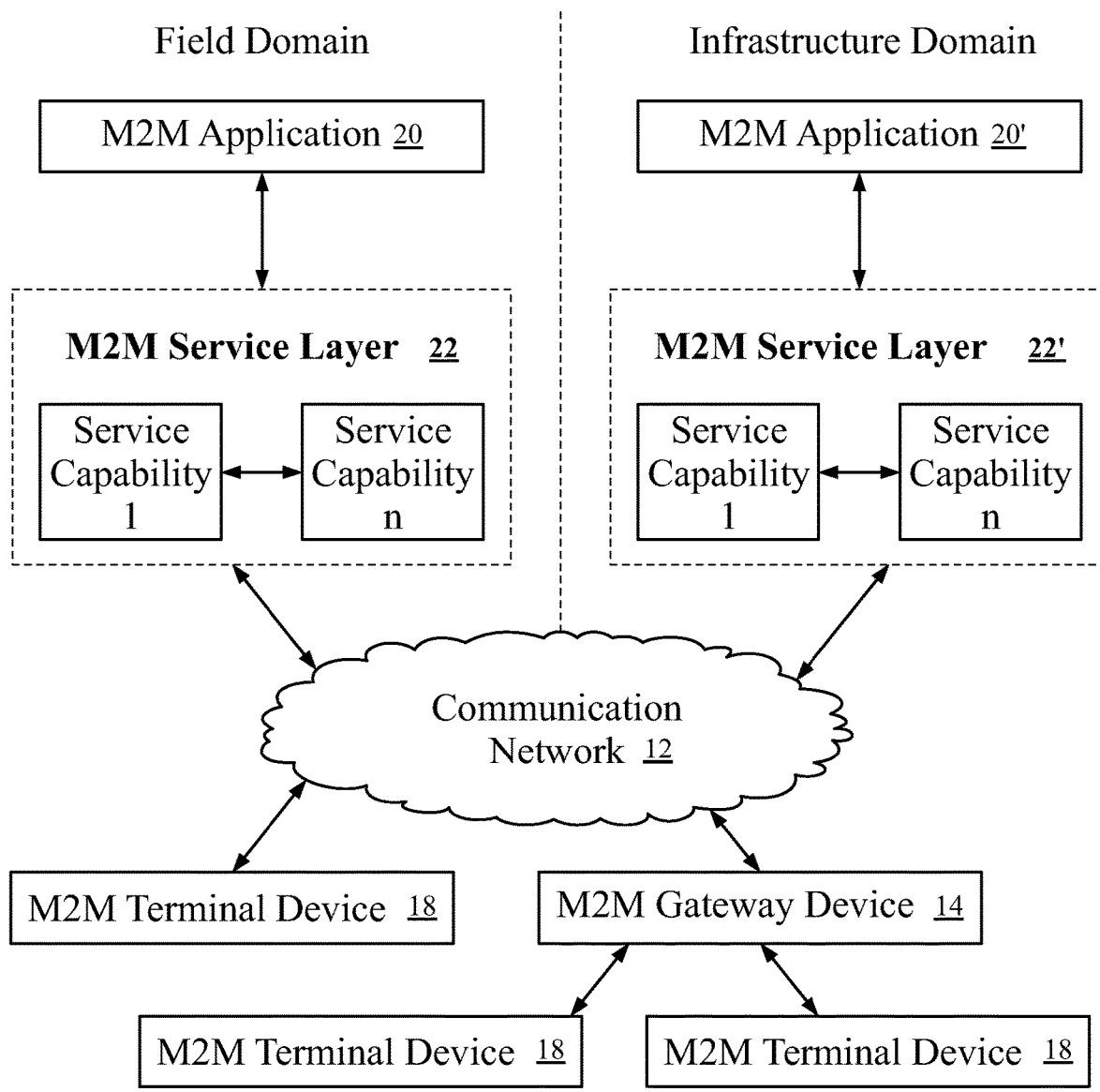
FIG. 19B is a diagram of an illustrated M2M service layer in the field domain that provides services for the M2M application, M2M gateway devices, and M2M terminal devices and the communication network.
Figure 19C:
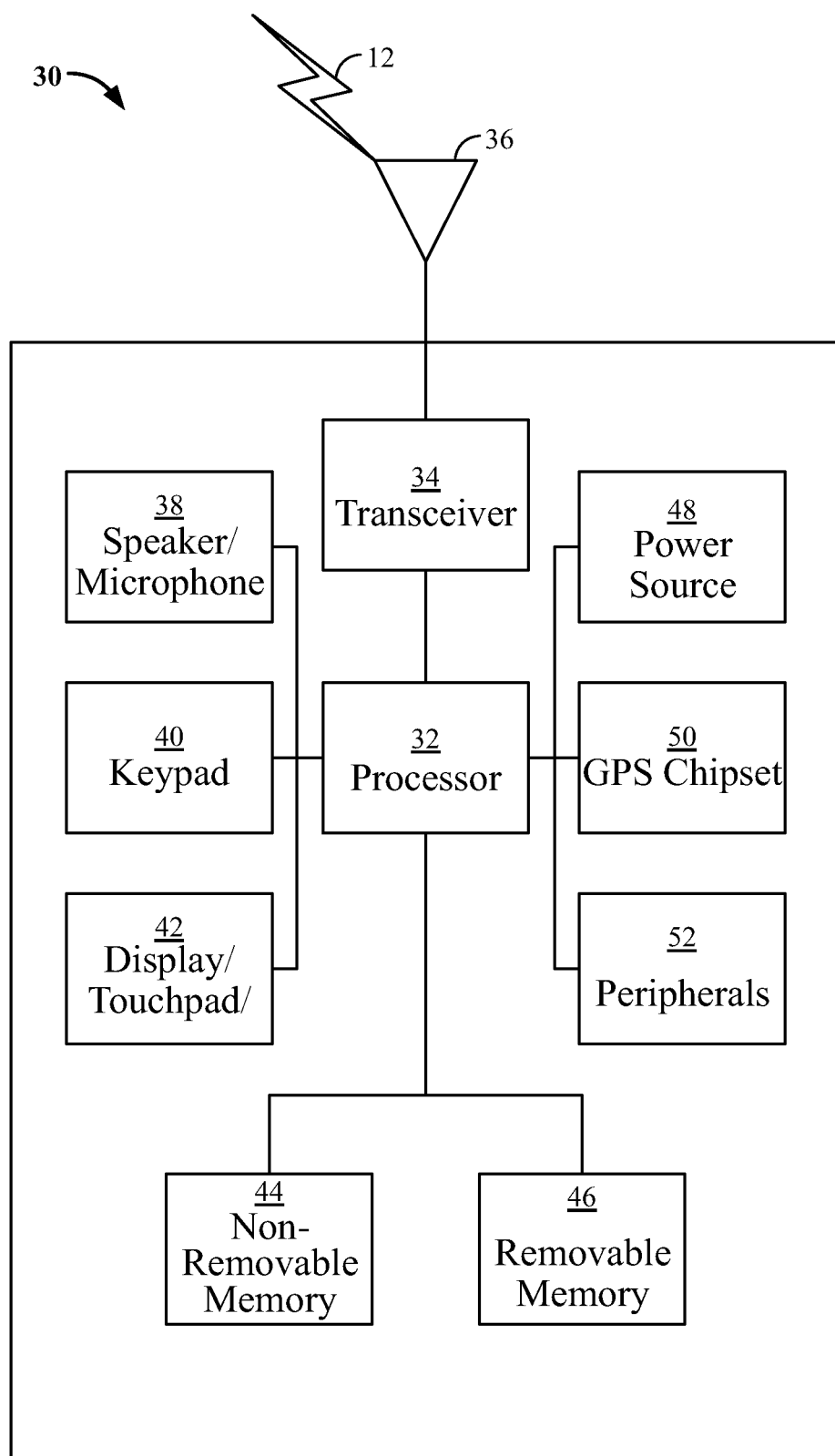
FIG. 19C is a diagram of an exemplary device that may be used to implement any of the network nodes described herein.
Figure 19D:
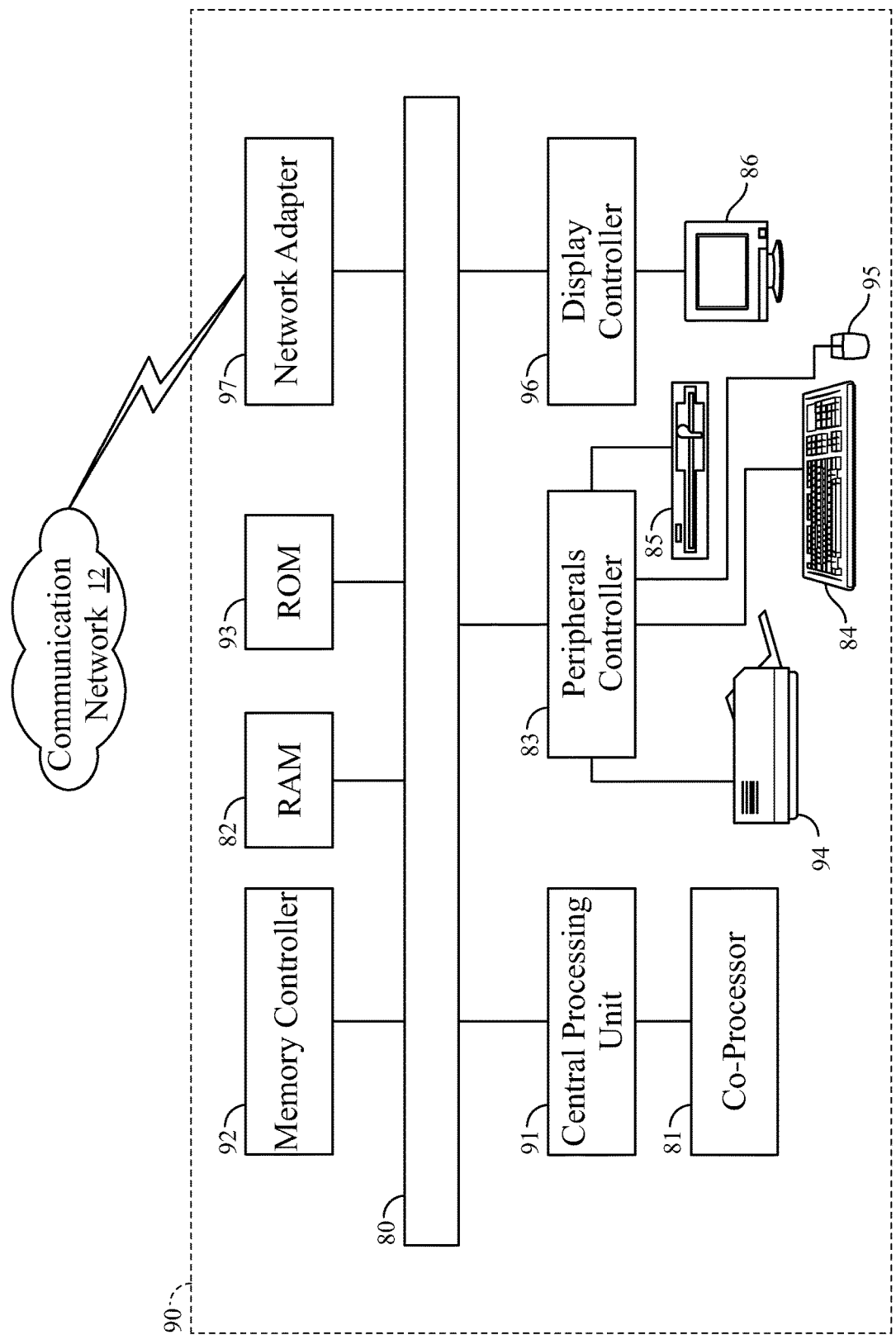
FIG. 19D is a block diagram of a computer system or server that may be used to implement any of the network nodes described herein.

It is understood that the entities performing the steps illustrated in FIG. 13 are logical entities that may be implemented in the form of software (i.e., computer-executable instructions) stored in a memory of, and executing on a processor of, a network node or computer system such as those illustrated in FIG. 19C or FIG. 19D. That is, the method(s) illustrated in FIG. 13 may be implemented in the form of software (i.e., computer-executable instructions) stored in a memory of a network node, such as the node or computer system illustrated in FIG. 19C or FIG. 19D, which computer executable instructions, when executed by a processor of the node, perform the steps illustrated in FIG. 13. It is also understood that any transmitting and receiving steps illustrated in FIG. 13 may be performed by communication circuitry of the node under control of the processor of the node and the computer-executable instructions (e.g., software) that it executes.

Since the management resources reside on the M2M gateway, an addressing scheme is required when targeting DM commands to be performed on the device. This addressing scheme should be short, compact, and standardized to allow different device types to all recognize the same target address. Table 3 shows three potential options on how to address DM resources on the device using the management resources defined in oneM2M as examples. These resource names point to the resource on the device that is represented by the management object.

TABLE 3

Addressing Scheme for Targeting Management Resources on Devices

| <mgmtObj> | Option 1 | Option 2 | Option 3 |
| --- | --- | --- | --- |
| deviceInfo | 0 | Devinfo | dvi |
| memory | 1 | Mem | mem |
| battery | 2 | Batt | bat |
| reboot | 3 | Boot | rbt |
| firmware | 4 | Fw | fwi |
| software | 5 | Sw | swi |
| eventLog | 6 | Elog | elg |
| deviceCapability | 7 | Devcap | dvc |
| areaNwkDeviceInfo | 8 | Netdevinf | ndi |

Option 1 is a simple enumeration of addressing management resources as numerical values. Each resource is assigned a number to represent the corresponding resource on the device. Then when the M2M gateway needs to perform a DM command, it can simply send "<command>#" to the device. This works since a DM command will refer to some action to be performed on the device and does not have any argument associated with that command. For example, rebooting a device requires sending a command without any argument to some resource (address or target Uniform Resource Indicator (URI)) the device associates with the reboot procedure. Upon receiving the command, the device will perform the action by executing the device drivers. No data is stored or maintained for the action.

Both options 2 and 3 provide an abbreviation of the corresponding management resource name that is human readable (option 2) or based on a fixed enumeration of 3 characters length (option 3). These options provide a shorthand notation of addressing the management action when targeting the device. For cases in which multiple instances of the same management resources are supported by a device, the additional instance number is appended to the addressing options as shown in Table 4.

TABLE 4

Support or Addressing Multiple Management Resource Instances

| <mgmtObj> | Option 1 | Option 2 | Option 3 |
| --- | --- | --- | --- |
| deviceinfo | 0.# | devinfo# | dvi# |
| memory | 1.# | mem# | mem# |
| battery | 2.# | batt# | bat# |
| reboot | 3.# | boot# | rbt# |
| firmware | 4.# | fw# | fwi# |
| software | 5.# | sw# | swi# |
| eventLog | 6.# | elog# | elg# |
| deviceCapability | 7.# | devcap# | dvc# |
| areaNwkDeviceInfo | 8.# | netdevinf# | ndi# |

Figure 14:
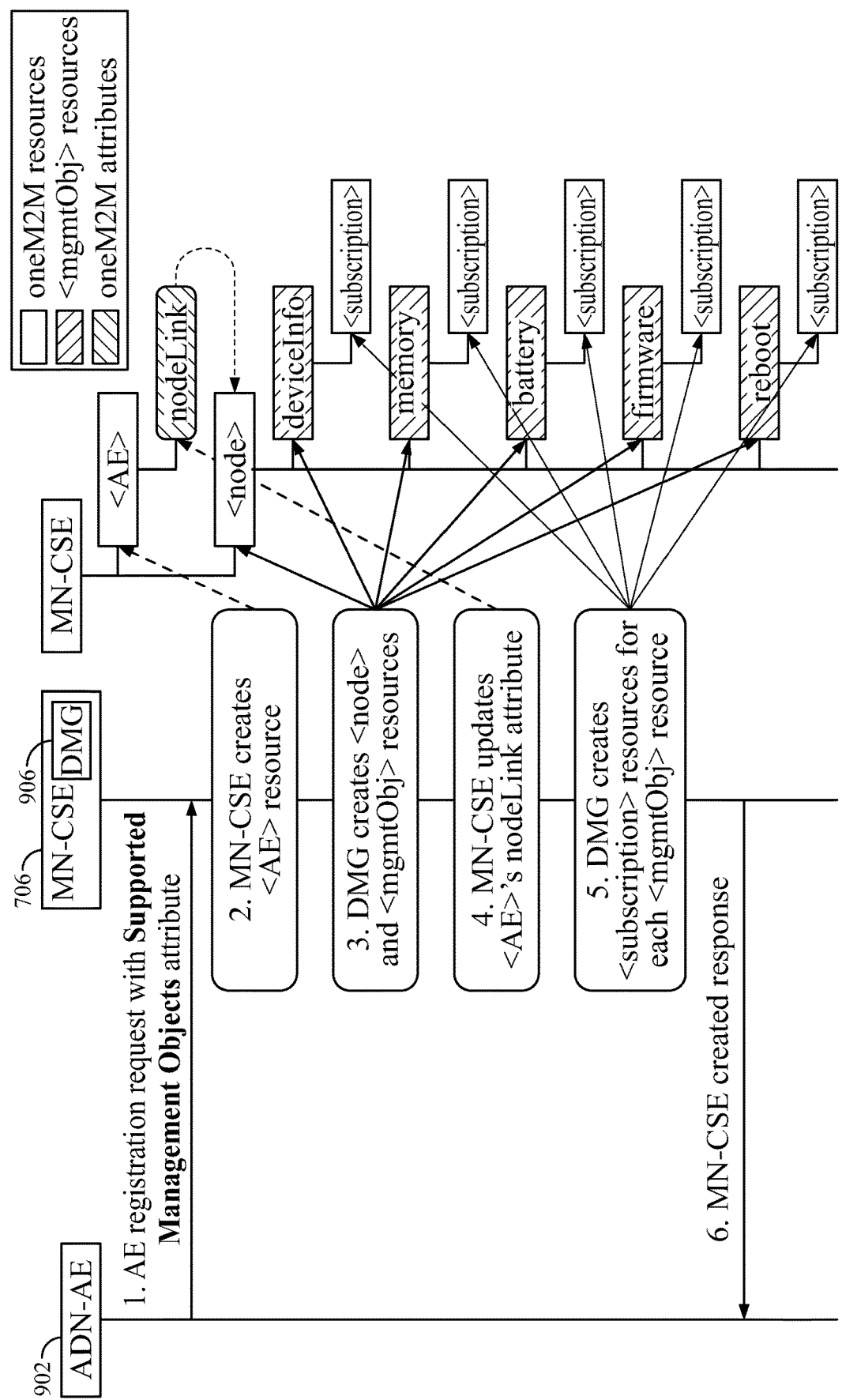
FIG. 14 is a diagram of an M2M gateway initiated automated request notification procedure.

After application registration and management resource creations are complete, the device is almost ready to be managed. The M2M gateway creates a subscription resource for each management resource the device supports. This will allow the M2M gateway to send notifications to the device whenever a management command is requested. The notification URI for each subscription resource will be "/dm" to indicate to the device the message is for DM operations. FIG. 14 shows the added step (Step 5) from the application registration in which the M2M gateway creates the subscription resource on behalf of the device. Once again, the call flow uses an oneM2M system as an example. Note that this procedure is an extension of the enhanced M2M application registration procedure.

At this point, all the management resources are created and when the M2M gateway sends the Created response to the device, it indicates that the device is ready to be managed. From this point on, any request to a management resource owned by the device will result in a notification message sent from the gateway to the device. In turn, the device will perform the requested DM operation and respond with the result.

Once a management resource is configured, a DM command can then be sent to initiate an action to be performed on the device. Within the management resource, there are attributes that are "executable". To trigger a DM operation, an application will perform an update of these executable attribute and the command is then sent to the device after some translation to the underlying DM protocol. In existing DM protocol, the command sent to the device consist of a DM command and the target URI of the operation. For example, the command "execute ./fumo/DownloadAndUpdate" is used in OMA DM to initiate the download and install of a firmware image. Note that this command doesn't require any parameters and consist of only the command and a target URI. These types of commands will be referred to DM action commands.

It is understood that the entities performing the steps illustrated in FIG. 14 are logical entities that may be implemented in the form of software (i.e., computer-executable instructions) stored in a memory of, and executing on a processor of, a network node or computer system such as those illustrated in FIG. 19C or FIG. 19D. That is, the method(s) illustrated in FIG. 14 may be implemented in the form of software (i.e., computer-executable instructions) stored in a memory of a network node, such as the node or computer system illustrated in FIG. 19C or FIG. 19D, which computer executable instructions, when executed by a processor of the node, perform the steps illustrated in FIG. 14. It is also understood that any transmitting and receiving steps illustrated in FIG. 14 may be performed by communication circuitry of the node under control of the processor of the node and the computer-executable instructions (e.g., software) that it executes.

Service layer messages are bound to an underlying transport protocol such as HyperText Transfer Protocol (HTTP). CoAP, and Message Queuing Telemetry Transport (MQTT). Within the messages, various service layer specific information are included. For conveying DM commands, it is not necessary to include this information. The DM commands can be carried within these protocols to provide only information required for the DM operation: the command and the target URI. This simplifies the message processing at the device. Since each command only needs a command-target_URI pair, there are two approaches to transfer these commands within transport protocols. One option is to embed the commands as header options and the second option is to provide the commands within the payload. In both cases, the information will be carried as a key-value pair, where the key is the DM command and the value is the target URI.

For the case in which the DM command pair is transmitted as a protocol header option, the option definition can be integrated as part of the base protocol itself or it may be defined as a service layer option. As an example, the CoAP protocol defines option numbers 0 to 255 for the base protocol options, while the range 256 to 2047 are reserved for public specification options and the range 2048 to 64999 is reserved for private or vendor specific options. In this case, the DM command option could be defined within the public specification range or in the private/vendor specific range.

To better structure the command pair for protocol options, the DM command can be encoded as shown in Table 5. The target in this case will be the target address provided by Table 3 or Table 4. As a result of this combination, the DM command pair is small and compact. Table 6 shows the combination as a key-value pair and the size in bytes of each.

In cases where it is not possible to provide the DM command pair as header options, the alternative is to include it in the payload. The same structure as presented in Table 6 is used and the structure can be encoded in JavaScript Object Notation (JSON) or Type-Length-Value (TLV) format to minimize the message size.

TABLE 5

DM Command Example Enumeration and Associate Target/Value

| Command Enum | DM Command | Target/Value | Description |
| --- | --- | --- | --- |
| 0 | Status | target | Get the status of current DM operation |
| 1 | State | target | Get the state of current <mgmtObj> function |
| 2 | Data | target | Get the data of associate target |
| 3 | Timer | value | Set a timer to run-delay running next command until timer expires |
| 6 | Reboot | target | Reboot the device |
| 7 | Factory Reset | target | Reset the device to the factory default image |
| 8 | Enable | target | Enable DM command associated with the target |
| 9 | Disable | target | Disable DM command associated with the target |
| 10 | Start | target | Start the process associate with the target |
| 11 | Stop | target | Stop the process associate with the target |

TABLE 5-continued

DM Command Example Enumeration and Associate Target/Value

| Command Enum | DM Command | Target/Value | Description |
| --- | --- | --- | --- |
| 12 | Lock | target | Lock the device |
| 13 | Wipe | target | Wipe the device of all information |
| 18 | Download | target | Download image associate with Uniform Resource Locator (URL) of the target |
| 19 | Download/Install | target | Download and install image associate with URL of the target |
| 20 | Install | target | Install software that was previously downloaded to the device |
| 21 | Remove | target | Remove software that was previously installed on the device |
| 22 | Activate | target | Activate a previously installed software |
| 23 | De-activate | target | De-activate a previously installed software |

TABLE 6

DM Command Option Enumeration

| Command Enum (1 byte) | Target/Value (1 to x bytes) |
| --- | --- |

Note that all the commands shown in Table 5 reference some DM related command except for the Timer command. This "command" was added to provide the additional capability of sequencing DM commands together into a script. These DM scripts carry action commands to be performed on the device in applications where it may be desirable to execute a sequence of related commands together in a periodic or repetitive fashion. For example, in diagnosing a remote IoT device, it might be desirable to capture some internal states over some duration of time for a range of input parameters. Another example is when some periodic sequence of commands needs to be executed repeatedly. A script could be used to execute these DM actions. The Timer command can be inserted in between DM commands to allow for some elapsed time should a certain command take longer to execute. A simple example of how the Timer command can be use is shown in Table 7. In this example, the DM action script is taking status of and getting data from an eventLog management resource before and after running the event for 1 hour. (In this example, the value 3600 for the Timer command is in units of seconds.)

TABLE 7

Example DM Action Script Using Timer Command

| Command Enum | Script Commands | Target/Value |
| --- | --- | --- |
| 0 | Status | elg |
| 2 | Data | elg |
| 10 | Start | elg |
| 3 | Timer | 3600 |
| 11 | Stop | elg |
| 0 | Status | elg |
| 2 | Data | elg |

This section presents some embodiments showing the utilization of the ideas presented in this disclosure as well as a couple of use cases.

A new CoAP DM header option can be used. oneM2M is bound to various transport protocols such as HTTP, CoAP, and MQTT. CoAP is typically used at the M2M gateway to communicate with devices due to it being lightweight and offering asynchronous responses. The oneM2M primitive is contained in the payload of the CoAP message. As shown above, the DM commands only need a key-value pair to trigger a management operation. To that end, this section shows how the DM commands can be included as header options within the CoAP message.

CoAP provides the ability to extend the protocol through the introduction of header options. Table 8 shows a DM CoAP header option with the following characteristics:

Critical/Elective (indicated by C column): This option is elective and should be ignored if unrecognized.

Proxy Unsafe (indicated by U column): This option is Proxy Safe-to-Forward.

NoCacheKey (indicated by N column): There is no Cache Key for this option.

Repeatable (indicated by R column): This option is repeatable, e.g. more than one option can exist and the options are appended to each other.

Name: This is the option name and will contain the DM Command option and value.

Format: The option will be encoded as a string of characters.

Length: Depending on the chosen name option for the objectPaths attribute (Table 3), the length of the option could vary accordingly as denoted by "x". The formula to determine the length value would be:

min(1+min[target.length],1+min[value.length]) where

1–length of Command enumeration as shown target.length—the minimum length of name chosen for objectPaths attribute in Table 3 value.length—the minimum length of value, which is 1 byte max(1+max[target.length],1+max[value.length]) where target.length—the maximum length of name chosen for objectPaths attribute in Table 3 value.length—the minimum length of value, which is 4 bytes

If Option 1 is selected and the numerical representation is capped at 16 bits, the length would be min(1+2,1+1) to max(1+2,1+4). In this case, the length will be 2-5 bytes.

If Option 2 is selected and the minimum and maximum size of the names are 2 to 9 respectively, the length would be min(1+2,1+1) to max(1+9,1+4). In this case, the length will be 2 to 10 bytes.

If Option 3 is selected and the fixed size is 3, the length would be min(1+3,1+1) to max(1+3.1+4). In this case, the length will be 2 to 5 bytes.

Default: There is no default value for the DM CoAP header option.

TABLE 8

DM CoAP Header Option

| C | U | N | R | Name | Format | Length | Default |
|---|---|---|---|------|--------|--------|---------|
|   |   | x | x | DM Command Option | string | 2-x | none |

The CoAP header option is further broken up into two fields as denoted in Table 6. The first field is a 1-byte enumeration for the DM command itself and the second field will contain the target or value associated with that DM command. Table 5 gave an example of how DM commands can be encoded to fit into a single byte field. Any new DM command defined for future <mgmtObj> resources will need to be added to this table to capture all commands use for management purposes. The Target/Value column specifies the parameter that is associated with the DM command.

Figure 15:
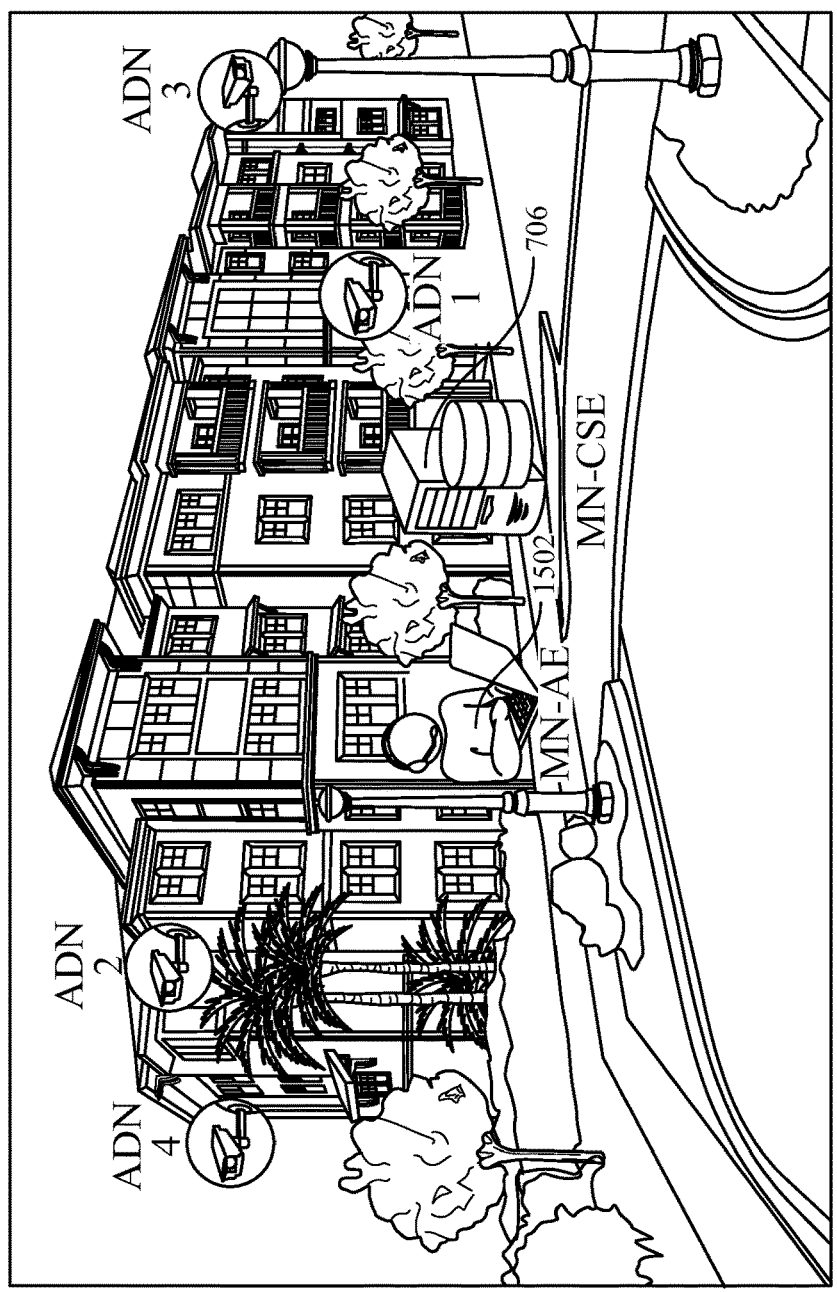
FIG. 15 is a diagram of a property management use case example.
Figure 15:
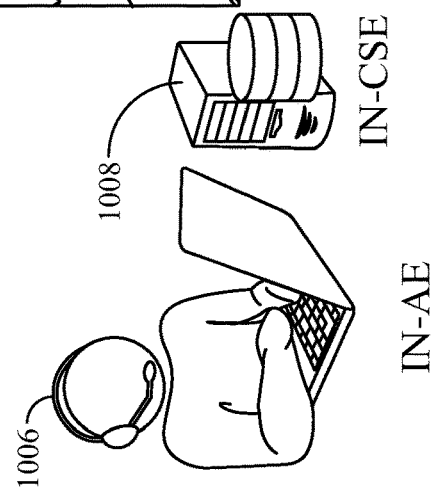

Two Use Case Examples are described below. In the first use case, a property management company operates numerous gated, apartment complexes and wants to install security cameras at each complex. Located in its central office is an IN-CSE server 1008 that is accessible from the cloud and located at each apartment complex is an MN-CSE 706. To each MN-CSE 706, security cameras are registered as ADN-AEs and they stream video footage to the MN-CSE 706, which operates as a DVR in addition to hosting the CSE. The security cameras support HTTP for video streaming and CoAP for the DM functions discussed in this disclosure. FIG. 15 shows the actors involved in this use case. It is understood that the functionality illustrated in FIG. 15 may be implemented in the form of software (i.e., computer-executable instructions) stored in a memory of, and executing on a processor of, a node of an M2M network (e.g., a server, gateway, device, or other computer system), such as one of those illustrated in FIG. 19C or 19D described below.

Each camera uses the enhanced AE registration procedure to register itself to the MN-CSE 706 and the DMG within the MN-CSE 706 performs the Automated Request Notification procedure so the camera can get notifications of DM requests. Within the MN-CSE 706, the created <node> and <mgmtObj> resources are announced to the IN-CSE 1008 so that management company personnel can manage the cameras at each site. Three DM action scripts are created: 1) a script implementing a video scan of the premise using the camera's pan capability, 2) a similar script as the previous one but the video scan is at a different angle, and 3) a firmware update script to load new algorithms to run on the camera. These scripts are associated with <group> resources within the oneM2M system.

The <mgmtObj> resources that are created to support the three scripts are shown in Table 9. Note that each camera will have its own management resources. Only the pertinent attributes are shown for brevity. The objectPaths attribute contains the addressing name from Table 4 (using Option 1) and the rest of the attributes are assigned the DM command enumerations from Table 6 for the respective attributes. Note that the DMG within the MN-CSE 706 is creating these resources on behalf of each camera as shown in the call flow of FIG. 14. In addition, the DMG also creates the <subscription> resource for each <mgmtObj> resource as shown in Step 5 of FIG. 14. The notificationURI will be set to "/dm" to indicate the notifications are for DM commands.

TABLE 9

Use Case <mgmtObj> Resources

| deviceCapability0 | Attribute Value | deviceCapability1 | Attribute Value |
|---|---|---|---|
| capabilityName | Pan Camera | capabilityNme | Tilt Camera |
| objeciPaths | 7.0 | objectPaths | 7.1 |
| capability ActionStatus | Status | capability ActionStatus | Status |
| currentState | State | currentState | State |
| enable | Enable | enable | Enable |
| disable | Disable | disable | Disable |

TABLE 9-continued

Use Case <mgmtObj> Resources

| firmware | Attribute Value | reboot | Attribute Value |
|---|---|---|---|
| name | MotionSenseAlg | objectPaths | 3.0 |
| objectPaths | 4.0 | reboot | Reboot |
| URL | /mn-cse/fw.image | factoryReset | Factory Reset |
| update | Enable | | |
| updateStatus | Status | | |

Table 10 shows the details of each DM action scripts. In script #1, the camera pans for 5 minutes to capture video of the area where each camera is installed. Script #2 captures the video at a different angle from script #1 for the same duration of 5 minutes. Finally, script #3 downloads a new firmware containing an improved motion sensing algorithm to the camera and reboots it so the new algorithm is run.

TABLE 10

Use Case DM Action Scripts

| Command Enum | Script Commands | Target/ Value |
|---|---|---|
| | DM Script #1 | |
| 8 | Enable | 7.0 |
| 3 | Timer | 300 |
| 9 | Disable | 7.0 |
| | DM Script #2 | |
| 8 | Enable | 7.1 |
| 9 | Disable | 7.1 |
| 8 | Enable | 7.0 |
| 3 | Timer | 300 |
| 9 | Disable | 7.0 |
| | DM Script #3 | |
| 19 | Download/Install | 4.0 |
| 0 | Status | 4.0 |
| 6 | Reboot | 3.0 |

The DM action scripts are represented within oneM2M's<group> resources and Table 11 shows each group's memberIDs attribute for each of the scripts from Table 10 (script #1<--->group1, script #2<--->group2, script #3<--->group3). In addition, group4 is created to include the cameras as its members. Personnel of the management company can then request a scan of the apartment complex by updating the <fanOutPoint> virtual resource of the associated <group> resource.

TABLE 11

Creating oneM2M <group> Resource from DM Action Scripts

| group1 | Attribute Value |
|---|---|
| memberIDs | deviceCapability0/enable timer/contentinstance deviceCapability0/disable |
| fanoutPoint | |
| group2 | Attribute Value |
| memberIDs: | deviceCapability1/enable deviceCapability1/disable deviceCapability0/enable timer/contentinstance deviceCapability0/disable |
| fanoutPoint | |

TABLE 11-continued

Creating oneM2M <group> Resource from DM Action Scripts

| group3 | Attribute Value |
|---|---|
| | firmware/update Firmware/updateStatus reboot/reboot |
| fanoutPoint | |

A video scan of the entire apartment complex is possible by performing the following oneM2M update operation: UPDATE <group1_URI>/fanOutPoint/<group4_URI>. This in turn will trigger the MN-CSE 706 to create a CoAP message with the commands of script1 and multicasts the message to all the devices in the group. The CoAP message contains the CoAP header options for script 1 as shown in FIG. 16 with no payloads as only commands are sent.

Figure 16:
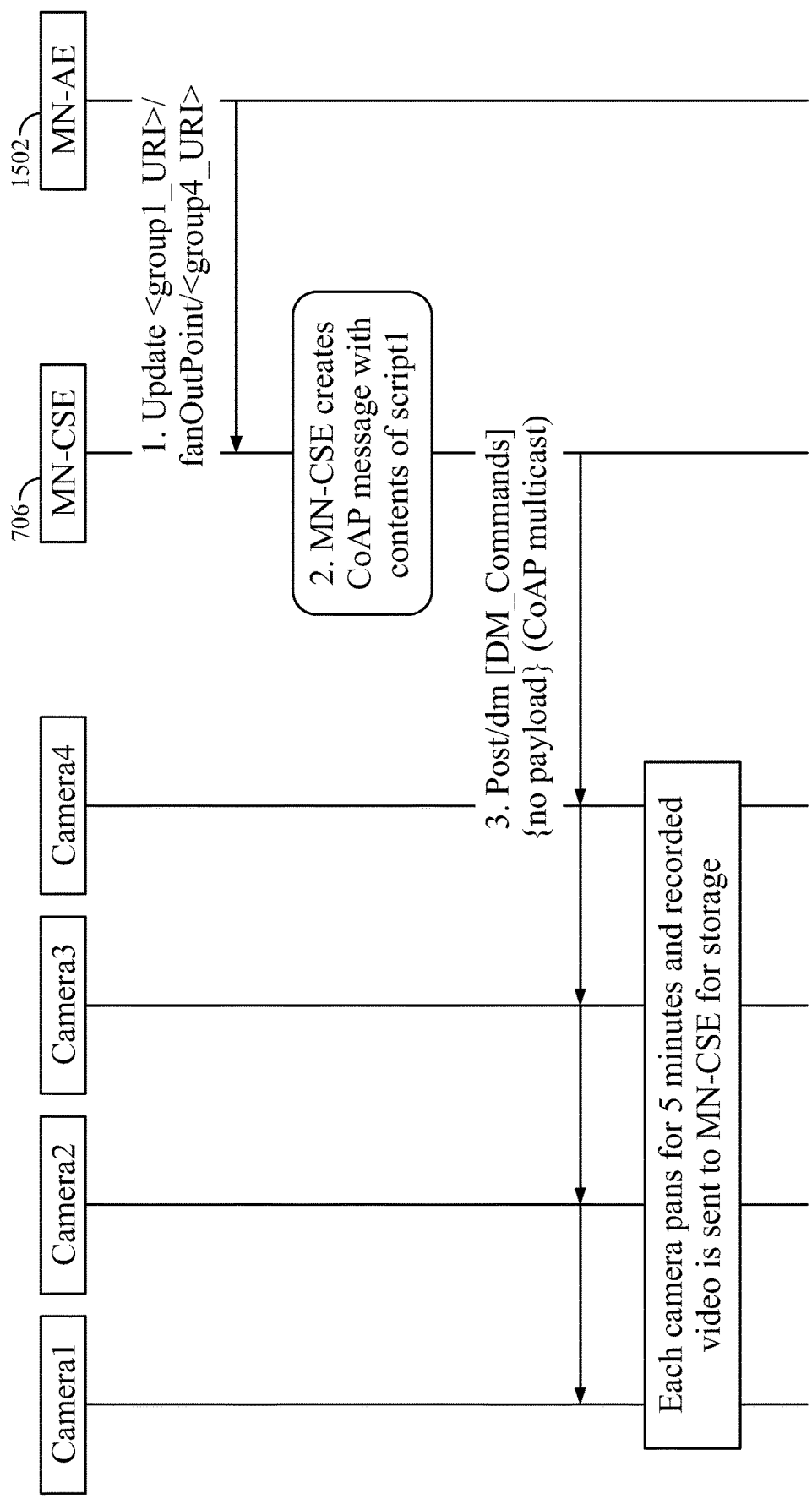
FIG. 16 is a call flow of a video scan of apartment complex.

It is understood that the entities performing the steps illustrated in FIG. 16 are logical entities that may be implemented in the form of software (i.e., computer-executable instructions) stored in a memory of, and executing on a processor of, a network node or computer system such as those illustrated in FIG. 19C or FIG. 19D. That is, the method(s) illustrated in FIG. 16 may be implemented in the form of software (i.e., computer-executable instructions) stored in a memory of a network node, such as the node or computer system illustrated in FIG. 19C or FIG. 19D, which computer executable instructions, when executed by a processor of the node, perform the steps illustrated in FIG. 16. It is also understood that any transmitting and receiving steps illustrated in FIG. 16 may be performed by communication circuitry of the node under control of the processor of the node and the computer-executable instructions (e.g., software) that it executes.

TABLE 12

CoAP DM Options for each DM Action Script

| DM Action Script | CoAP OptionDelta | CoAP OptionLength | DM Command Option Cmd Enum | Target/ Value |
|---|---|---|---|---|
| Script #1 CoAP DM options | ... | 4 | 8 | 7.0 |
| | 0 | 3 | 3 | 300 |
| | 0 | 4 | 9 | 7.0 |
| Script #2 CoAP DM options | ... | 4 | 8 | 7.1 |
| | 0 | 4 | 9 | 7.1 |
| | 0 | 4 | 8 | 7.0 |
| | 0 | 3 | 3 | 300 |
| | 0 | 4 | 9 | 7.0 |
| Script #3 CoAP DM options | ... | 4 | 19 | 4.0 |
| | 0 | 4 | 0 | 4.0 |
| | 0 | 4 | 6 | 3.0 |

Figure 17:
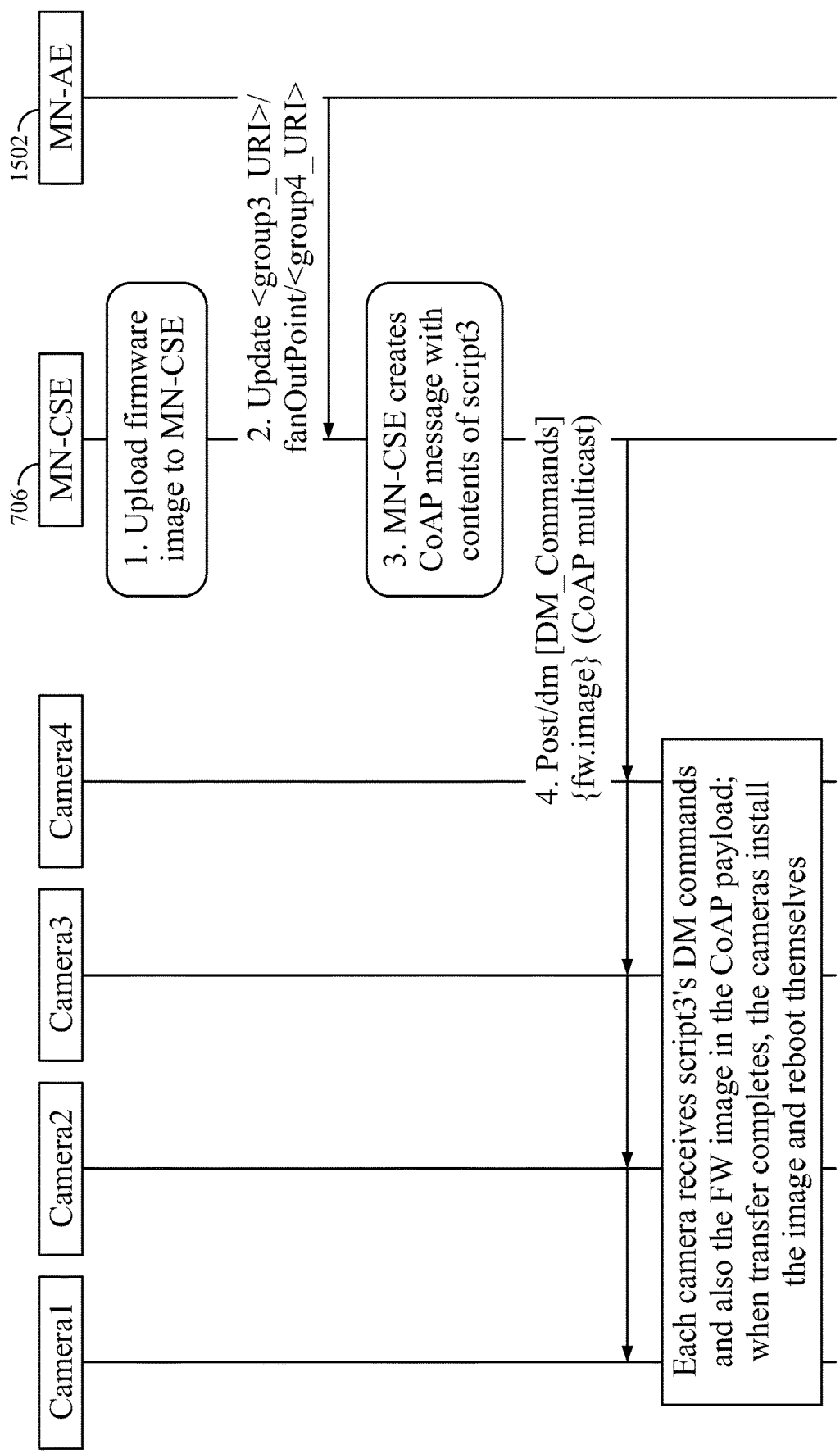
FIG. 17 is a call flow of a firmware download and install use case.

FIG. 17 shows the call flow for performing firmware update. In step 1, the firmware image is uploaded to the MN-CSE 706. Then the MN-AE 1502 performs a oneM2M update operation in step 2: UPDATE <group3_URI>/fanOutPoint/<group4_URI>. The MN-CSE 706 creates a CoAP message with the contents of script3 as shown in FIG. 16. This time, the firmware image is sent in the payload of the CoAP message. Then in step 4, the MN-CSE 706 multicasts the CoAP message to all the cameras. When the transfer is complete, each camera installs the firmware and reboots itself.

The above two call flows shows operations initiated at the MN-CSE 706. However, an IN-AE 1006 can also perform the same operations using the announced resources at the IN-CSE 1008. The oneM2M operations are the same except they target the announced resources instead. The IN-CSE 1008 in turn will relay the request to the MN-CSE 706, which then executes the call flows of FIG. 16 and FIG. 17.

It is understood that the entities performing the steps illustrated in FIG. 17 are logical entities that may be implemented in the form of software (i.e., computer-executable instructions) stored in a memory of, and executing on a processor of, a network node or computer system such as those illustrated in FIG. 19C or FIG. 19D. That is, the method(s) illustrated in FIG. 17 may be implemented in the form of software (i.e., computer-executable instructions) stored in a memory of a network node, such as the node or computer system illustrated in FIG. 19C or FIG. 19D, which computer executable instructions, when executed by a processor of the node, perform the steps illustrated in FIG. 17. It is also understood that any transmitting and receiving steps illustrated in FIG. 17 may be performed by communication circuitry of the node under control of the processor of the node and the computer-executable instructions (e.g., software) that it executes.

Figure 18:
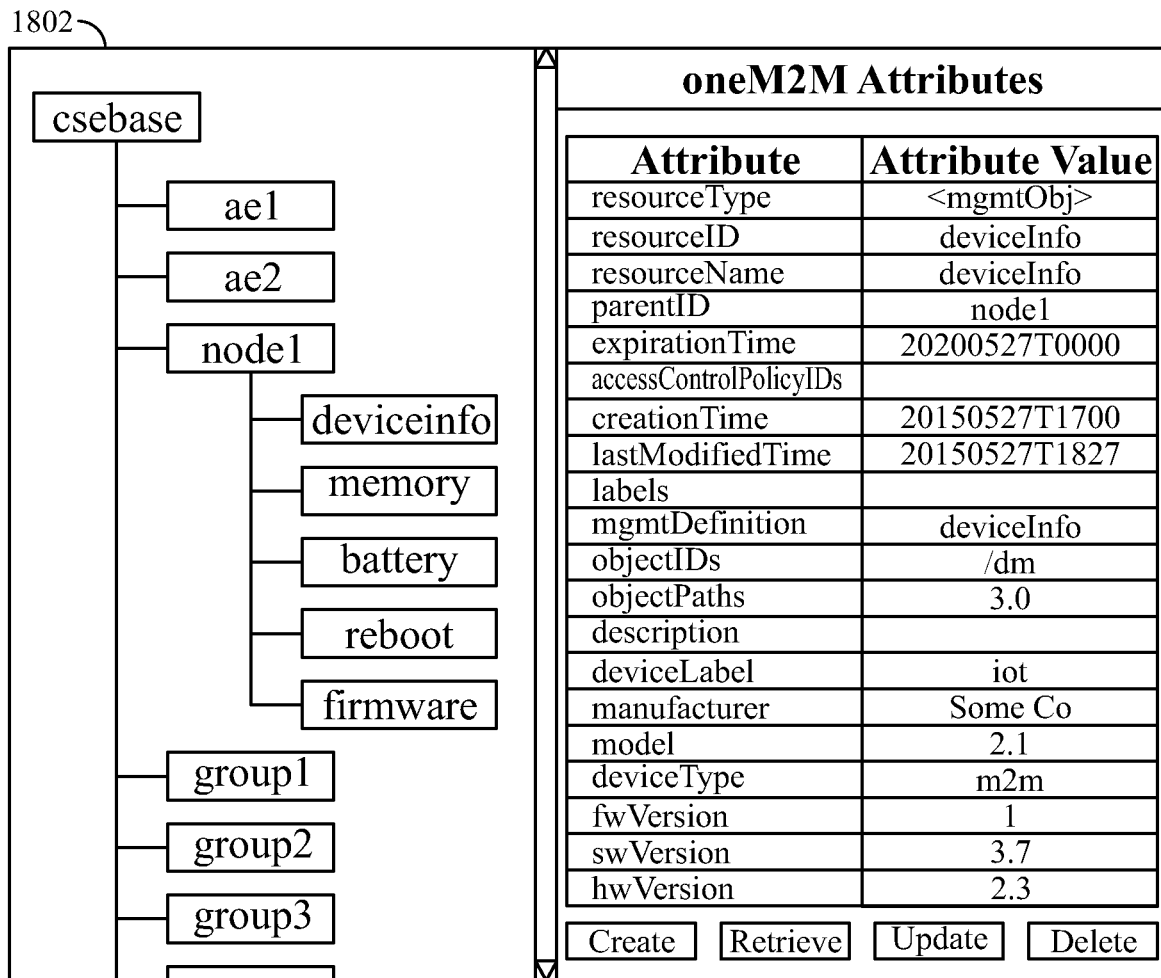
FIG. 18 is a diagram of a Graphical User Interface of one embodiment.

FIG. 18 shows an example Graphical User Interface (GUI) 1802 that shows the details of the oneM2M resource tree as well as a table of oneM2M attributes for the selected resource. In this figure, the deviceInfo <mgmtObj> resource is highlighted, which means the user has selected this resource. On the right, a table shows the oneM2M attributes associate with this resource and at the bottom are the operations a user can select to operate on the resource. Within the table, the objectIDs and objectPaths attributes show the device's target URI and resource address used for sending the DM command associated with this <mgmtObj>. These values will be used by the SL to target the DM operation on the device. It is to be understood that interface 1802 can be produced using displays such as those shown in FIGS. 19C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 19A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as DM servers 102, service layers 402, management adapters 502, ADN-AE 902, MN-CSE 706, DMG 906, ADNs 1002 and 1004, IN-CSE 1008, IN-AE 1006, DM gateway 1108, DM client 1110, MN-AE 1502, and logical entities to produce GUI 1802.

As shown in FIG. 19A, the M2M, IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 19A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN. WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 19B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as DM servers 102, service layers 402, management adapters 502, ADN-AE 902, MN-CSE 706, DMG 906, ADNs 1002 and 1004, IN-CSE 1008, IN-AE 1006, DM gateway 1108, DM client 1110, MN-AE 1502, and logical entities to produce GUI 1802. The M2M service layer 22 may be implemented by one or more servers, computers, devices, virtual machines (e.g. cloud/storage farms, etc.) or the like, including for example the devices illustrated in FIGS. 19C and 19D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 19B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments. M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as DM servers 102, service layers 402, management adapters 502, ADN-AE 902, MN-CSE 706, DMG 906, ADNs 1002 and 1004, IN-CSE 1008, IN-AE 1006, DM gateway 1108, DM client 1110, MN-AE 1502, and logical entities to produce GUI 1802 may be hosted within a M2M service layer instance hosted by an M2M node, such as an M2M server, M2M gateway, or M2M device, as shown in FIG. 19B. For example, the logical entities such as DM servers 102, service layers 402, management adapters 502, ADN-AE 902, MN-CSE 706, DMG 906, ADNs 1002 and 1004, IN-CSE 1008, IN-AE 1006. DM gateway 1108, DM client 1110, MN-AE 1502, and logical entities to produce GUI 1802 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 19C or FIG. 19D described below.

Further, logical entities such as DM servers 102, service layers 402, management adapters 502, ADN-AE 902, MN-CSE 706, DMG 906, ADNs 1002 and 1004, IN-CSE 1008, IN-AE 1006, DM gateway 1108, DM client 1110, MN-AE 1502, and logical entities to produce GUI 1802 can implemented as part of an M2M network that uses a Service Oriented Architecture (SOA) and/or a Resource-Oriented Architecture (ROA) to access services of the present application.

FIG. 19C is a block diagram of an example hardware/software architecture of a M2M network node 30, such as an M2M device 18, an M2M gateway 14, an M2M server, or the like. The node 30 can execute or include logical entities such as DM servers 102, service layers 402, management adapters 502, ADN-AE 902, MN-CSE 706, DMG 906, ADNs 1002 and 1004, IN-CSE 1008, IN-AE 1006, DM gateway 1108, DM client 1110, MN-AE 1502, and logical entities to produce GUI 1802. The device 30 can be part of an M2M network as shown in FIG. 19A-B or part of a non-M2M network. As shown in FIG. 19C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 19C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 19C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 19C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 19D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as DM servers 102, service layers 402, management adapters 502, ADN-AE 902, MN-CSE 706, DMG 906, ADNs 1002 and 1004, IN-CSE 1008, IN-AE 1006, DM gateway 1108, DM client 1110, MN-AE 1502, and logical entities to produce GUI 1802. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation. CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 19A and FIG. 19B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 19 A-B or the device 30 of FIG. 19 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway. UE, UE/GW, or any of the nodes of the mobile core network, service layer or network application provider, may be implemented in the form of such computer executable instructions. Logical entities such as DM servers 102, service layers 402, management adapters 502, ADN-AE 902. MN-CSE 706, DMG 906, ADNs 1002 and 1004, IN-CSE 1008. IN-AE 1006, DM gateway 1108. DM client 1110, MN-AE 1502, and logical entities to produce GUI 1802 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus, the apparatus providing a common services entity, the apparatus comprising a processor, a memory, and computer-executable instructions stored in the memory which, when executed by the processor, cause the apparatus to:
   receive a registration message from an application hosted on a device, the registration message indicating management objects supported by the application;
   register, based on the registration message, the application by creating an application resource at a service layer of the apparatus;
   create, based on the registration message, management object resources for the application at the service layer; and
   return, to the application, a response comprising an identifier of the application resource and an identifier of the management object resource.

2. The apparatus of claim 1, wherein the instructions further cause the apparatus to create a subscription resource at the service layer of the apparatus for each created management object resource.

3. The apparatus of claim 1, wherein the instructions further cause the apparatus to create, based on the registration message, a second application resource at the service layer of the apparatus an additional application resource, the additional application resource corresponding to the application and being associated with the created management object resources.

4. The apparatus of claim 3, wherein the instructions further cause the apparatus to create an application entity resource at the service layer of the apparatus, the application entity resource corresponding to the application hosted on the device, wherein the apparatus updates an attribute at the application entity resource that points to the additional application resource based on the registration message.

5. A method for use by an apparatus, the apparatus providing a common services entity, wherein the apparatus comprises a processor and memory, and wherein the apparatus further includes computer-executable instructions stored in the memory which, when executed by the processor, perform the method, the method comprising:
   receiving a registration message from an application hosted on a device, the registration message indicating management objects supported by the application;
   registering, based on the registration message, the application by creating an application resource at a service layer of the apparatus;
   creating, based on the registration message, management object resources for the application at the service layer of the apparatus; and
   returning, to the application, a response comprising an identifier of the application resource and an identifier of the management object resource.

6. The method of claim 5, further comprising creating a subscription resource at the service layer of the apparatus for each created management object resource.

7. The method of claim 5, further comprising creating, at the service layer of the apparatus and based on the registration message, an additional resource, the additional resource corresponding to the application and being associated with the created management object resources.

8. The method of claim 7, further comprising creating, based on the registration message, an application entity resource at the service layer of the apparatus, the application entity resource corresponding to the application, wherein the apparatus updates an attribute at the application entity resource that points to the additional resource.

9. A computer-readable non-transitory storage medium (CRM) storing instructions which, when executed by a processor, cause an apparatus to perform operations comprising:
    receiving a registration message from an application hosted on a device, the registration message indicating management objects supported by the application;
    registering, based on the registration message, the application by creating an application resource at a service layer of the apparatus;
    creating, based on the registration message, management object resources for the application at the service layer of the apparatus; and
    returning, to the application, a response comprising an identifier of the application resource and an identifier of the management object resource.

10. The CRM of claim 9, wherein the operations further comprise creating a subscription resource at the service layer of the apparatus for each management object resource.

11. The CRM of claim 9, wherein the operations further comprise creating, at the service layer of the apparatus and based on the registration message, an additional resource, the additional resource corresponding to the device application and being associated with the created management object resources.

12. The CRM of claim 9, wherein the operations further comprise creating, based on the registration message, an application entity resource at the service layer of the apparatus, the application entity resource corresponding to the application hosted on the device, wherein the apparatus updates an attribute at the application entity resource that points to the additional resource.

* * * * *